United States Patent [19]

Iskiyan et al.

[11] Patent Number: 4,875,155
[45] Date of Patent: Oct. 17, 1989

[54] PERIPHERAL SUBSYSTEM HAVING READ/WRITE CACHE WITH RECORD ACCESS

[75] Inventors: James L. Iskiyan; Vernon J. Legvold; Peter L. H. Leung; Guy E. Martin, all of Tucson, Ariz.

[73] Assignee: International Business Machines Corporation, Armonk, N.Y.

[21] Appl. No.: 749,897

[22] Filed: Jun. 28, 1985

[51] Int. Cl.⁴ .............................................. G06F 12/08
[52] U.S. Cl. ............................ 364/200; 364/243.41; 364/243.4; 364/222.82; 364/222.81; 364/256.4; 364/256.3; 364/261
[58] Field of Search ... 364/200 MS File, 900 MS File

[56] References Cited

U.S. PATENT DOCUMENTS

| | | | |
|---|---|---|---|
| 3,588,839 | 6/1971 | Belady et al. | 364/200 |
| 3,723,976 | 3/1973 | Alvarez et al. | 364/200 |
| 4,020,466 | 4/1977 | Cordi et al. | 364/200 |
| 4,070,706 | 1/1978 | Scheuneman | 364/200 |
| 4,077,059 | 2/1978 | Cordi et al. | 364/200 |
| 4,092,713 | 5/1978 | Scheuneman | 364/200 |
| 4,156,906 | 5/1979 | Ryan | 364/200 |
| 4,157,586 | 6/1979 | Gannon et al. | 364/200 |
| 4,228,503 | 10/1980 | Waite et al. | 364/200 |
| 4,322,795 | 3/1982 | Lange et al. | 364/200 |
| 4,322,815 | 3/1982 | Broughton | 364/900 |
| 4,394,732 | 7/1983 | Swenson | 364/200 |
| 4,394,733 | 7/1983 | Swenson | 364/200 |
| 4,410,942 | 10/1983 | Milligan et al. | 364/200 |
| 4,413,317 | 11/1983 | Swenson | 364/200 |
| 4,414,644 | 11/1983 | Tayler | 364/900 |
| 4,415,970 | 11/1983 | Swenson et al. | 364/200 |
| 4,419,725 | 12/1983 | George et al. | 364/200 |
| 4,423,479 | 12/1983 | Hanson et al. | 364/200 |
| 4,425,615 | 1/1984 | Swenson et al. | 364/200 |
| 4,430,712 | 2/1984 | Coulson et al. | 364/200 |
| 4,433,374 | 2/1984 | Hanson et al. | 364/200 |
| 4,437,155 | 3/1984 | Sawyer et al. | 364/200 |
| 4,463,424 | 7/1984 | Mattson et al. | 364/200 |
| 4,466,059 | 8/1984 | Bastian et al. | 364/200 |
| 4,468,730 | 8/1984 | Dodd et al. | 364/200 |
| 4,476,526 | 10/1984 | Dodd | 364/200 |
| 4,490,782 | 12/1984 | Dixon et al. | 364/200 |
| 4,499,539 | 2/1985 | Vosacek | 364/200 |
| 4,506,323 | 3/1984 | Pusic et al. | 364/200 |
| 4,654,819 | 3/1987 | Stiffler et al. | 364/900 |
| 4,695,943 | 9/1987 | Keeley et al. | 364/200 |

FOREIGN PATENT DOCUMENTS 0009412 9/1979 European Pat. Off.
0009938 9/1979 European Pat. Off.

Primary Examiner—Gareth D. Shaw
Assistant Examiner—Kevin A. Kriess
Attorney, Agent, or Firm—G. E. Clark; H. F. Somermeyer

[57] ABSTRACT

Data is accessed by record identification in a peripheral sub-system having cache and back store to transfer the most recently updated version of one or more records stored in the subsystem where one version of a record may be in a back store and a modified version of the record may be in a cache storage, by a method and apparatus including table lookup means for indicating for each record of each track of each device in said back store whether record data stored in cache is modified with respect to a version of the same record stored in back store; and means responsive to the indicating means for transferring the modified or backing store version of a record in accordance with predetermined criteria.

15 Claims, 10 Drawing Sheets

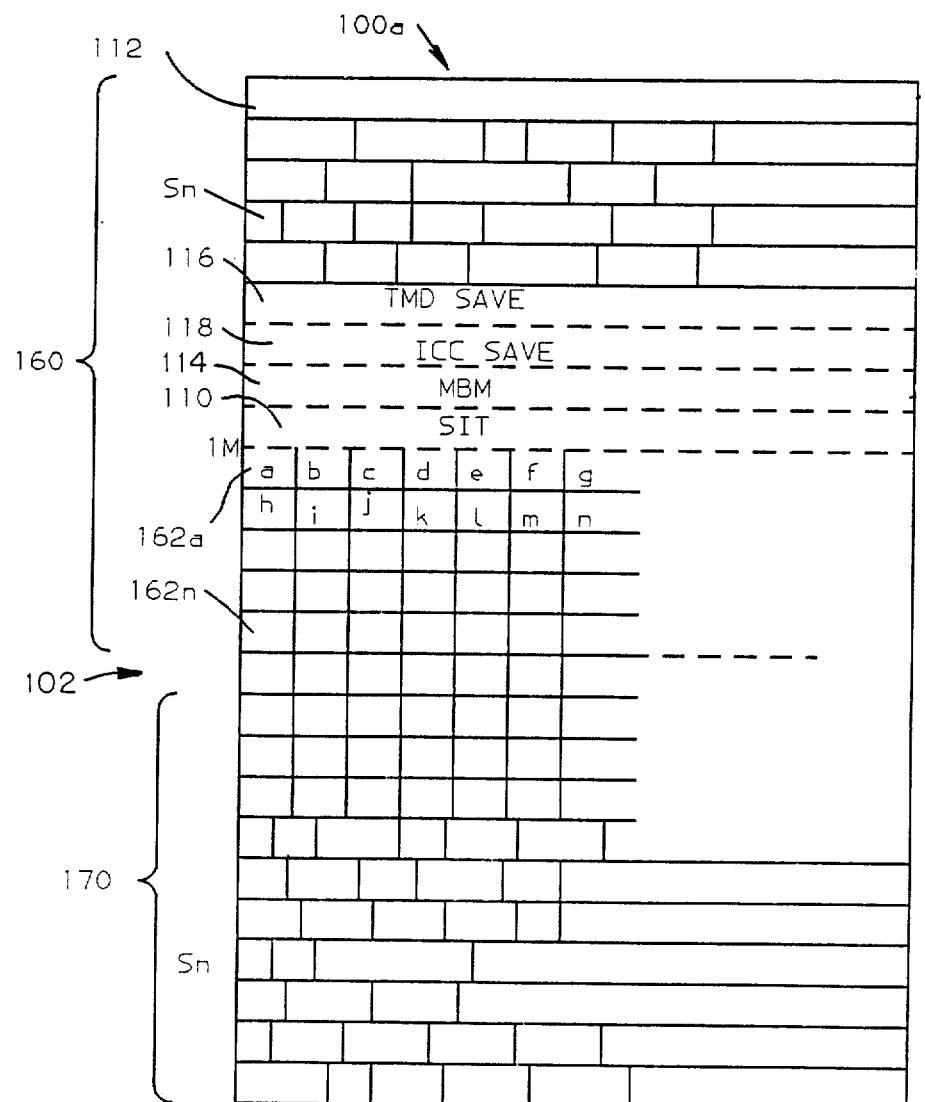
FIG. 3.1
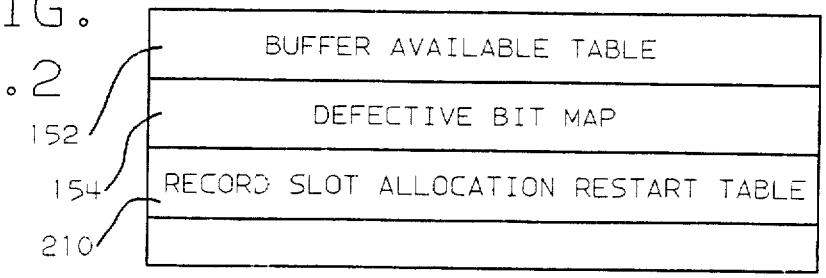
FIG. 3.2

FIG. 4

SIT 110

| HEX | DESCRIPTION |
|-----|-------------|
| 000 | SIT Word 0<br>  Byte  0-1 Directory Entry Offset<br>           Zero Indicates Invalid<br>  Byte  2-3 Directory Entry Offset<br>  Byte  4-5 Directory Entry Offset<br>  Byte  6-7 Directory Entry Offset<br>  Byte  8-9 Directory Entry Offset<br>  Byte  A-B Directory Entry Offset<br>  Byte  C-D Directory Entry Offset<br>  Byte  E-F SRC |
| 001 | Sit Word 1 |
| XXX | Number of additional entries depend of the size of the Subsystem Storage |

FIG. 6

DIRECTORY ENTRY

| HEX | DESCRIPTION |
|---|---|
| 000 | Directory Entry Information<br>  Byte 0         - MRU/Device Number<br>    Bits 0-3     - MRU Counter<br>    Bits 4-7     - Device Number<br>  Byte 1         - Flags<br>    Bit 0        - Entry Valid<br>    Bit 1        - Modified<br>    Bit 2        - Length Equal to Record Size<br>    Bit 3        - Non-Volatile Log<br>    Bits 4-5     - Type of List<br>          00 - MRU/LRU<br>          01 - Defective<br>          10 - Pinned Retryable<br>          11 - Pinned Non-Retryable<br>    Bits 6-7 - Record Slot Size<br>          00 - Record Size 1<br>          01 - Record Size 2<br>          10 - Record Size 3<br>          11 - Record Size 4<br>  Bytes 2-3     - PA (cylinder/head)<br>    Byte 2       - Cylinder Low<br>    Byte 3       - Cylinder High and Head<br>      Bits 0-1   - Zero<br>      Bit 2      - 512 Cylinder High<br>      Bit 3      - 256 Cylinder High<br>      Bit 4-7    - Head Number<br>  Byte 4         - Record Number<br>  Bytes 5-7     - Record Slot Address<br>Directory Entry Pointers<br>  Bytes 8-9     - Address of next older entry<br>                     in chain<br>  Bytes 10-11   - Address of next newer entry<br>                     in chain<br>  Bytes 12-13   - Address of next entry in hash<br>                     chain (entry that hashed to<br>                     the same SIT entry)<br>  Bytes 14-15   - SRC |
| 001 | 2nd Directory Entry |
| XXX | Number of additional entries depend of the size of the Subsytem Storage |

FIG. 7

MODIFIED BIT MAP 114

| HEX | DESCRIPTION |
|---|---|
| 000 | Bytes 0-1     - Cylinder 0<br>  Bits 0-7    - Heads 0-7<br>  Bits 8-14   - Heads 8-14<br>  Bit 15      - Unused<br>Bytes 2-3     - Cylinder 1<br>  Bits 0-7    - Heads 0-7<br>  Bits 8-14   - Heads 8-14<br>  Bit 15      - Unused<br>Bytes 4-5     - Cylinder 2<br>  Bit 0-7     - Heads 0-7<br>  Bits 8-14   - Heads 8-14<br>  Bit 15      - Unused<br>Bytes 6-7     - Cylinder 3<br>  Bits 0-7    - Heads 0-7<br>  Bits 8-14   - Heads 8-14<br>  Bit 15      - Unused<br>Bytes 8-13    - Unused<br>Bytes 14-15   - SRC |
| 001 to 0DD | Remainder of MBM Entries for Device 0 |
| 0DE to 0FF | Unused |
| 100 to FFF | MBM Entries for Devices 1-15 |

FIG. 8

TRACK MODIFIED DATA TABLE 116

| HEX | DESCRIPTION |
|---|---|
| 000 to 007 | TMD Area for Device 0<br>Bytes 0-7     - TMD Information Entry 1<br>Bytes 8-15    - TMD Information Entry 2<br>Bytes 16-23   - TMD Information Entry 3<br>Bytes 24-31   - TMD Information Entry 4<br>Bytes 32-39   - TMD Information Entry 5<br>Bytes 40-47   - TMD Information Entry 6<br>Bytes 48-55   - TMD Information Entry 7<br>Bytes 56-63   - TMD Information Entry 8<br>Bytes 64-71   - TMD Information Entry 9<br>Bytes 72-79   - TMD Information Entry 10<br>Bytes 80-87   - TMD Information Entry 11<br>Bytes 88-95   - TMD Information Entry 12<br>Bytes 96-103  - TMD Information Entry 13<br>Bytes 104-111 - TMD Information Entry 14<br>Bytes 112-119 - TMD Information Entry 15<br>Bytes 120-125 - Pad Bytes<br>Bytes 126-127 - SRC |
| 008 to 00F | TMD Information Entries 16-30 |
| 030 to 037 | Bytes 0-79 - TMD Information Entries 91-100<br>Bytes 80-125 - Pad Bytes<br>Bytes 126-127 - SRC |
| 038 to 03F | Unused (Pad to 64 word Boundary) |
| 040 to 3FF | TMD Areas for Devices 1-15 |

FIG. 9

NON-RETENTIVE ICC SAVE AREA 118

| HEX | DESCRIPTION |
|---|---|
| 000 to 007 | Non-retentive ICC Area for Device 0<br>Byte 0         - Search ID Equal ICW<br>Byte 1         - Record Number<br>Bytes 2-3      - Record Length<br>Byte 4         - Set Cache Address ICW<br>Bytes 5-7      - Slot Address<br>Byte 8         - Read or Write ICW<br>Byte 9         - Repeat Count<br>Bytes 10-11    - Directory Address<br>Bytes 12-23    - Non-Retentive ICC Entry<br>Bytes 24-35    - Non-Retentive ICC Entry<br>Bytes 36-47    - Non-Retentive ICC Entry<br>Bytes 48-59    - Non-Retentive ICC Entry<br>Bytes 60-71    - Non-Retentive ICC Entry<br>Bytes 72-83    - Non-Retentive ICC Entry<br>Bytes 84-95    - Non-Retentive ICC Entry<br>Bytes 96-107   - Non-Retentive ICC Entry<br>Bytes 108-119  - Non-Retentive ICC Entry<br>Bytes 120-125  - Pad Bytes<br>Bytes 126-127  - SRC |
| 008 to 00F | Non-Retentive ICC Entries 11-20 |
| / / | / / / / / / / / / / |
| 048 to 04F | Non-Retentive ICC Entries 91-100 |
| 050 to 09F | Non-Retentive ICC Area for Device I |
| / / | / / / / / / / / / / |
| 500 to 54F | Non-Retentive ICC Areas for Device 15 |
| 550 to 5FF | Unused (Pad to 256 Word Boundary) |

FIG. 10

RECORD SLOT HEADER

| HEX | DESCRIPTION |
|-----|-------------|
| 000 | Byte 0      — Sector Number<br>Byte 1      — Zero<br>Bytes 2-3   — Data Length<br>Bytes 4-13  — Undefined<br>Bytes 14-15 — SRC |

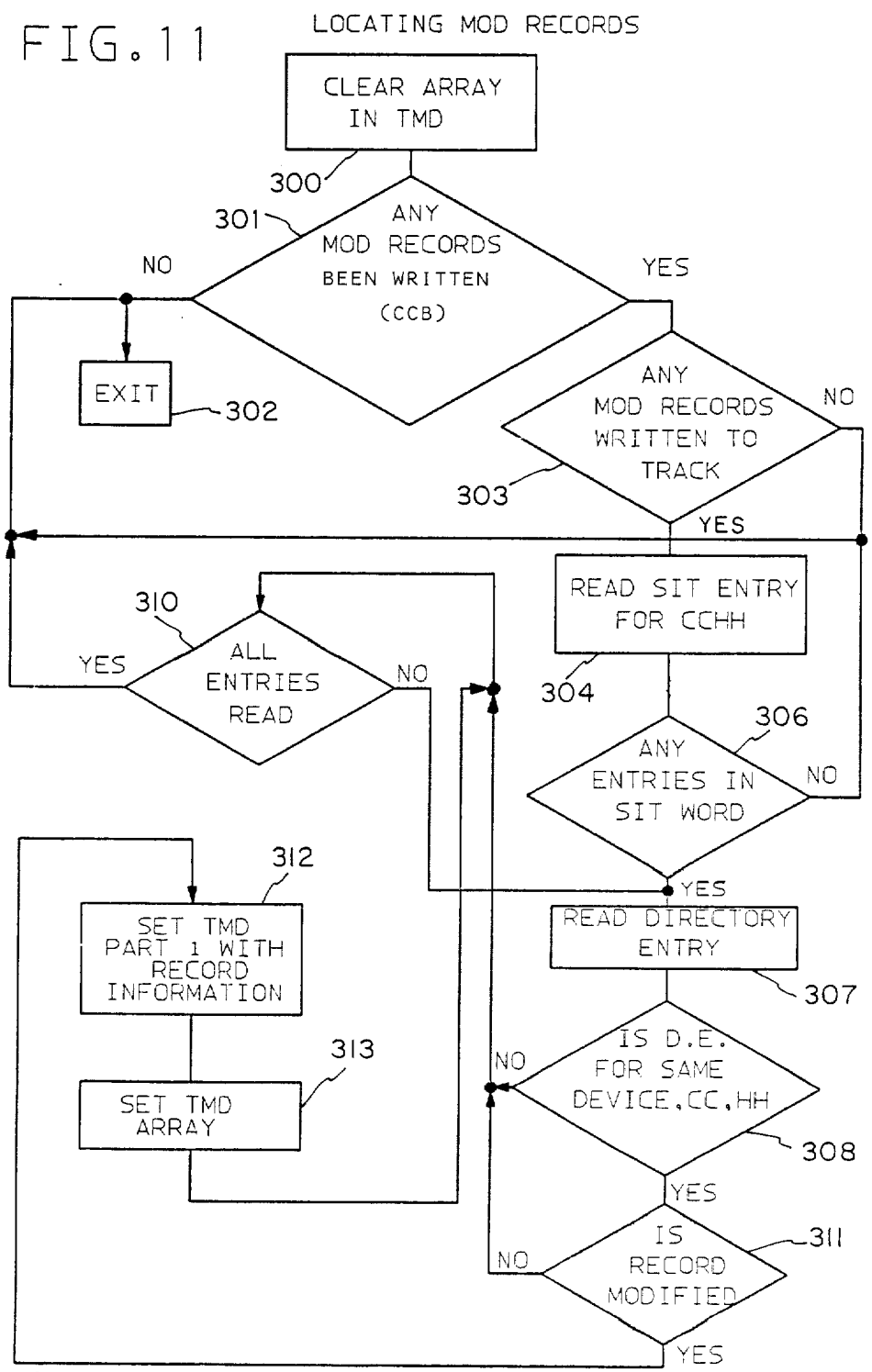

PERIPHERAL SUBSYSTEM HAVING READ/WRITE CACHE WITH RECORD ACCESS

DOCUMENTS INCORPORATED BY REFERENCE

IBM System/370 Principles of Operation, IBM Document No. GA22-7000.
IBM System/370 Extended Architecture Principles of Operation, IBM Document No. SA22-7085.
IBM 3880 Storage Control Unit Models 1, 2, 3, and 4, IBM Reference Manual GA26-1661.
IBM 3880 Direct Access Storage Description and User's Guide, IBM Document No. GA26-1664.
IBM 3880 Direct Access Storage Models AD4, BD4, AE4, and BE4 General Information, IBM Document No. GC26-4193.
Transaction Processing Facility Version 2 (TPF-2) IBM General Information Manual, GH20-6200.
IBM System/360 and System/370 I/O Interface Channel to Control Unit Original Equipment Manufacturer's Information, IBM Document No. GA22-6974-4.
General Information Manual, VM/SP with High Performance Option, IBM Document No. GC19-6221.
Student Manual S/370 and Extended Architecture; Multiple Virtual Storage/Systems Product, IBM Document No. SR23-5470.
U.S. Pat. No. 3,400,371, which describes a host processor and peripheral subsystem employing Input/Output (I/O) channels operated with channel control words (CCW) and using command chaining.
U.S. Pat. No. 4,031,521 for its showing of an idle loop in a programmed processor.
U.S. Pat. No. 4,464,713 shows a subsystem data storage hierarchy including a large backing store and a cache and a method for accessing data from either the cache or backing store.
U.S. Pat. No. 4,466,059 shows a data storage hierarchy having a backing store and a cache buffer store, and a method for determining whether data is to be stored in the cache or backing store or both.
U.S. Pat. No. 4,500,954 shows a data storage hierarchy having a backing store and a cache and means for direct read and write to the backing store for bypassing cache or for updating cache.
U.S. Pat. No. 4,429,363 shows a data storage hierarchy having a cache buffer and a backing store including a method for moving data from the backing store to the cache buffer based on cache activity of a previous storage reference.
Copending commonly-assigned patent application Ser. No. 426,367, filed Sept. 29, 1982.

| | GLOSSARY OF ACRONYMS | |
|---|---|---|
| 1 | | |
| 2 | AUX JIB | AUXILIARY MICROPROCESSOR TERMED JIB |
| 3 | BAT | BUFFER AVAILABLE TABLE |
| 4 | CC | CYLINDER ADDRESS IN DASD (TWO BYTES) |
| 5 | CCB | CACHE CONTROL BLOCK |
| 6 | CCHH | TRACK ADDRESS OF DASD (CYLINDER & HEAD) |
| 7 | CCR | CHANNEL COMMAND RETRY SEE GA22-6974-4 |
| 8 | CCW | CHANNEL COMMAND WORD SEE GA22-6974-4 |
| 9 | CPU | CENTRAL PROCESSING UNIT |
| 10 | CU | CONTROL UNIT |
| 11 | D | DEVICE OR DASD NUMBER OR ADDRESS |
| 12 | D.E. | DIRECTORY ENTRY |
| 13 | DASD | DIRECT ACCESS STORAGE DEVICE (DISK UNIT) |
| 14 | DBM | DEFECTIVE BIT MAP; SEE FIG. 3.2 |
| 15 | DL | DATA LENGTH INDICATOR IN DASD RECORD |
| 16 | HEX | HEXIDECIMAL; A 16-BYTE STORAGE REGISTER |
| 17 | HH | HEAD ADDRESS IN DASD (RECORDING SURFACE) |
| 18 | I/O | INPUT/OUTPUT OF A HOST PROCESSOR |
| 19 | IBM | INTERNATIONAL BUSINESS MACHINES CORPORATION |
| 20 | ICC | INTERNAL COMMAND CHAIN; SEE U.S. PAT. NO. 4,533,955 |
| 21 | ICW | INTERNAL COMMAND WORD; SEE U.S. PAT. NO. 4,533,955 |
| 22 | IML | INITIAL MICROPROGRAM LOAD |
| 23 | IPL | INITIAL PROGRAM LOAD |
| 24 | K | ONE THOUSAND |
| 25 | KL | KEY LENGTH INDICATOR IN DASD RECORD |
| 26 | LRU | LEAST RECENTLY USED |
| 27 | MBM | MODIFIED BIT MAP; SEE FIG. 7 |
| 28 | MRU | MOST RECENTLY USED |
| 29 | MVS/SP | MULTIPLE VIRTUAL STORAGE/SYSTEM PRODUCT |
| 30 | PSF | PERFORM SUBSYSTEM FUNCTION |

BACKGROUND OF THE INVENTION

U.S. Pat. No. 4,533,955 which shows an earlier cache DASD data storage subsystem.

FIELD OF THE INVENTION

The present invention relates to information handling systems and more particularly to electronic information handling peripheral subsystems having a cache storage and a backing storage and control means for controlling read and write access to records in the cache and in the backing store.

There is a group of users of information handling systems which require a very high number of transactions per second. This group has a clear need for fast access to data, reliable storage of data, efficient Direct Access Storage Devices, a high message processing rate, balanced activity between DASD actuators and tailored hardware and software. These installations have average DASD I/0 rates ranging from 500 to over 13,500 transactions per second. These users are typically found in the airline, financial, hotel, and data service industries. Their requirements make them sensitive to service times and use of DASD storage.

The present invention is especially adopted to satisfy these users' present and future needs. Using cache technology, it supplies fast and reliable access to data and provides more efficient use of DASD storage.

DESCRIPTION OF THE PRIOR ART

The following are systems representative of the known prior art.

Peripheral data-storage hierarchies have been used for years for providing an apparent store as suggested by Eden, et al in U.S. Pat. No. 3,569,938. Eden, et al teach that in a demand paging or request system, caching data in a cache-type high-speed front store (buffer) can make a peripheral storage system appear to have a large capacity, yet provide fast access to data; fast access being faster than that provided by the back store. Eden, et al also teach that the back store can be a retentive store, such as magnetic tape recorders and magnetic disk recorders (direct access storage devices or DASD), while the front store can be a volatile store, such as a magnetic core store. With the advances in data storage technology, the front store typically includes semiconductive-type data storage elements. U.S. Pat. No. 3,839,704 shows another form of such a data storage hierarchy.

An important aspect of data storage hierarchies is enabling data integrity. That is, the data received from the user, such as a central processing unit (CPU) or other data handling device, should be returned to the supplying unit either correct or with an indication that errors may exist. Also, it is typical practice in data storage hierarchies to automatically move data from a higher level to a lower level for retentive storage as well as limiting the data in the higher levels such that other data can be stored for fast access. U.S. Pat. No. 4,020,466 shows copying changes from a high-level store to a backing store, while U.S. Pat. No. 4,077,059 shows forcing copyback under predetermined conditions. Such copyback operations can consume data storage hierarchy time, i.e., so much data may be copied back that access to the data by a using unit may be degraded. This problem is partially solved by U.S. Pat. No. 3,588,839 which teaches that the only data that need be copied back from a high-level storage unit to a low-level storage unit is that data that is altered, i.e., where there is noncongruence between data in a backing store and data in a front store. Data storage hierarchies have taken diverse forms. For example, in accordance with the Eden, et al U.S. Pat. No. 3,569,938 a single high-speed store serviced several users. U.S. Pat. No. 3,735,360 shows that each processor can have its own high-speed store, or cache, for different performance reasons. Performance of the data storage hierarchies also is affected by the algorithms and other controls used to place predetermined data into the cache front store, or high-speed (fast access) storage portion. Accordingly, U.S. Pat. No. 3,898,624 shows that varying the time of fetching data from a backing store to a front, or caching store can be selected by a computer operator in accordance with the programs being executed in a CPU. In this manner, it is hoped that the data resident in the cache, or upper level of the hierarchy, will be that data needed by the CPU while other data not needed is not resident. All of these operations become quite intricate.

Accordingly, evaluation programs have been used to evaluate how best to manage a data storage hierarchy. U.S. Pat. Nos. 3,964,028 and 4,068,304 show performance monitoring of data storage hierarchies for enhancing optimum performance while ensuring data integrity. Much of the work with respect to data storage hierarchies has occurred in the cache and main memory combinations connected to a CPU. The principles and teachings from a cached main memory relate directly to caching and buffering peripheral systems, as originally suggested by Eden, et al, supra. Of course, main memory has been used prior to Eden, et al for buffering or caching data from a magnetic tape and disk unit for a CPU, i.e., a main memory was not only used as a CPU working store but also as a buffer for peripheral devices. To enhance access to data, some data is "pinned" or "bound" to the front store; that is, a copy of such data is guaranteed to be kept in the front store while other data is subject to replacement by new data based upon usage characteristics. Unless such pinned data is copied to a retentive store, a significant data integrity exposure exists.

The performance monitoring referred to above indicates that it is not always in the best interests of total data processing performance and integrity to always use a caching buffer interposed between a using unit and a backing store. For example, U.S. Pat. No. 4,075,686 teaches that a cache can be turned on and off by special instructions for selectively bypassing the cache. Further, the backing store or memory can be segmented into logical devices with some of the logical devices, or segments, being selectively bypassed, such as for serial or sequential input-output operations. This patent further teaches that, for certain commands, it is more desirable to not use cache than to use cache. U.S. Pat. No. 4,268,907 further teaches that for a command specifying the fetching of data words an indicator flag is set to a predetermined state. To prevent replacement of extensive numbers of data instructions already stored in cache during the execution of such instructions, such flag conditions replacement circuits to respond to subsequent predetermined commands to bypass cache storage for subsequently fetched data words. U.S. Pat. No. 4,189,770 shows bypassing a cache for operand data while using cache for instruction data.

In newer designs, the storage capacity of the front store tends to increase. Such increased capacity is often accompanied with faster I/O channel rates, which in turn place increased demands on which data is stored in the front store. Such changes mean that more and more data is stored in the front store. This increased data storage in a volatile front store aggravates a data integrity problem which may be caused by power supply perturbations or outages, for example. Integrity can be ensured by always recording the data in a retentive back store. This requirement tends to degrade performance, i.e., increases data access times. Selective retentive journalling of data as suggested by C. E. Hoff, et al in IBM TECHNICAL DISCLOSURE BULLETIN article "Selective Journalling", June 1975, Vol. 18 No. 1, pages 61-2, reduces performance degradation but does not control the data integrity exposure in a completely satisfactory manner. In a similar vein, Campbell, et al in the IBM TECHNICAL DISCLOSURE BULLETIN, Vol. 18 No. 10, March 1976, pages 3307-9 show multiple replacement classes in a replacement control for limiting interlevel transfers in a multi-level hierarchy. Such techniques still leave a large data integrity exposure or provide limited performance.

A peripheral data storage system's operation-completion indication to a host processor is usually a DEVICE END signal; the DEVICE END indicates that the data received from the host is retentively stored in the data storage system. U.S. Pat. No. 4,410,942 shows a tape data recorder system including a volatile data buffer having plural modes of operation. In a preferred mode, termed "tape buffer mode", the above-described DEVICE END signal is supplied to the host processor when the data is stored in the volatile buffer but not yet stored in the retentive-storing tape recorder. The data is stored in the tape recorder after the DEVICE END signal. A separate SYNCHRONIZE command from the host to the data storage system requires that all data stored in the volatile buffer be then stored in the tape recorder. In other modes of operation of the volatile buffer, the DEVICE END signal is only sent to the host after the data is stored in the retentive tape recorder. The data storage system also honors a command READ DATA BUFFER which transfers data stored in the buffer (whether sent to the buffer by the host or by a tape recorder) to the host. When data is sent by a host to the data storage system, such data is always intended to be and will be recorded in a retentive tape recorder, as indicated above. The READ DATA BUFFER involves an error recovery technique; usually there is no way of retrieving the data in buffer that was received from the host for a write-to-tape operation.

A possible solution to the data integrity exposure is to provide a retentive front store, such as used in the IBM 3850 Mass Storage System. There DASDs are the cache, or front store, while magnetic tape is a back store. A simplified showing of this type of data storage hierarchy is found in the article by Blickenstaff, et al "Multilevel Store Directory Integrity", IBM TECHNICAL DISCLOSURE BULLETIN, Vol. 20 No. 3, August 1977, pages 939–940. Unfortunately, such retentive buffer usually does not provide the performance (short data access times) sometimes demanded by present-day computers. Accordingly, for a truly high-performance data storage hierarchy, some means must be found to use a large volatile front store while controlling the attendant data integrity exposures. This exposure control also applies to other systems such as printing, communications, and the like.

IBM Technical Disclosure Bulletin, Volume 21 No. 1, June 1978, page 280 describes a mechanism for reducing cache deadlock probability on a store-end-cache multiprocessor having hardware control check pointing without incurring degradation.

IBM Technical Disclosure Bulletin, Volume 18 No. 8, January 1976, page 2643, describes a method for selectively copying portions of a data base normally stored in a memory subsystem portion of a data processing system.

IBM Technical Disclosure Bulletin, Volume 20 No. 5, October 1977, page 1955, describes a check point copy operation for a two-stage data storage facility.

SUMMARY OF THE INVENTION

Therefore, it is an object of the present invention to access for transfer in a peripheral subsystem having a cache store and a back store most recently updated versions of one or more records stored in said subsystem where one version of a record may be in a back store and a modified version of the record may be in a cache storage, by a method and apparatus including means for indicating for each record of each track of each device in said back store whether data of each record stored in cache is modified with respect to a version of the same record stored in the back store; and means responsive to the indicating means for transferring the modified or back store version of a record in accordance with predetermined criteria.

It is a further object of the present invention to control record data transfer in a peripheral subsystem having cache and back stores which further includes means for identifying records in the cache store which are modified with respect to versions of the same records in the back store.

It is yet a further object of the present invention to identify modified records stored in a peripheral subsystem further including means for locating records stored in a cache store which are modified versions of records stored in a back store.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 3.1 is a map of cache storage organized in accordance with the present invention.

FIG. 3.2 is a map of control storage organized in accordance with the present invention.

FIG. 4 is a map of a scatter index table used with the preferred embodiment of the present invention.

FIG. 6 is a diagram of the format of a directory entry in accordance with the present invention.

FIG. 7 is a diagram of a Modified Bit Map in accordance with the present invention.

FIG. 8 is a diagram of a Track Modified Data Table in accordance with the present invention.

FIG. 9 is a diagram of the Internal Command Chain Save area structure in accordance with the present invention.

FIG. 10 is a diagram of the format of a record slot header in accordance with the present invention.

FIG. 11 is a flow diagram of a preferred embodiment of the method of the present invention.

In the drawing, like elements are designated with similar reference numbers, and identical elements in different specific embodiments are designated by identical reference numbers.

DESCRIPTION OF THE PREFERRED EMBODIMENTS

Figure 1:
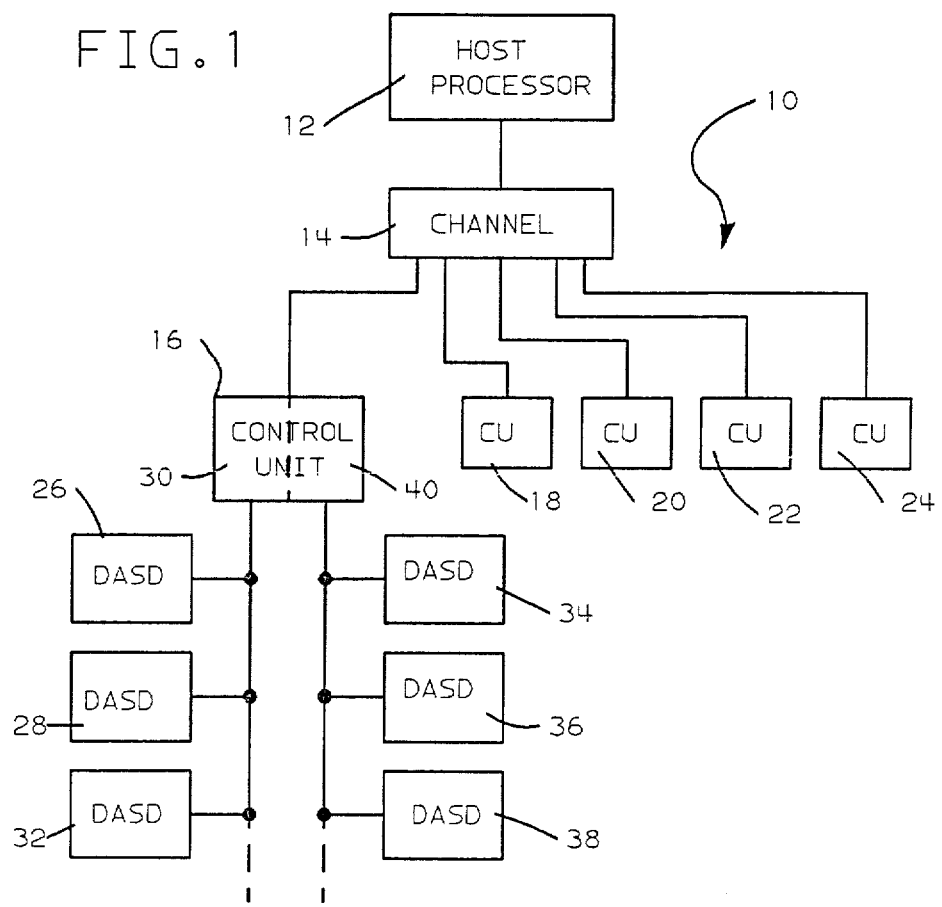
FIG. 1 is a block diagram of an information handling system embodying the present invention.

Referring now to FIG. 1, an information handling system in which the present invention is embodied will be described.

Information handling system 10 includes a host processor 12 which may be one or more processing units connected in any uni-processor or multi-processor configuration. The host processor 12 communicates with channel 14, which provides standard interface signals for communications between the host and peripheral subsystems. A plurality of peripheral subsystem control units 16, 18, 20, 22, 24, etc. are connected to channel 14 (see GA26-1661 and GA22-6974, supra). Channel 14 is one of a number of channels connected to host processor 12. Each control unit, such as control unit 16, has connected thereto a number of peripheral devices, such as direct access storage devices (DASD) 26, 28, 32, 34, 36 and 38.

The present invention is directed more specifically to the control of record data transfers between channel 14, control unit 16 and DASDs 26–38. The method and apparatus of the present invention are embodied in control units 16, 18, 20, 22, 24, etc. Each control unit according to the present invention is divided into two or more partitions 30, 40.

Apparatus and method of a preferred embodiment of the present invention will be described in greater detail with respect to FIGS. 2-11.

Figure 2:
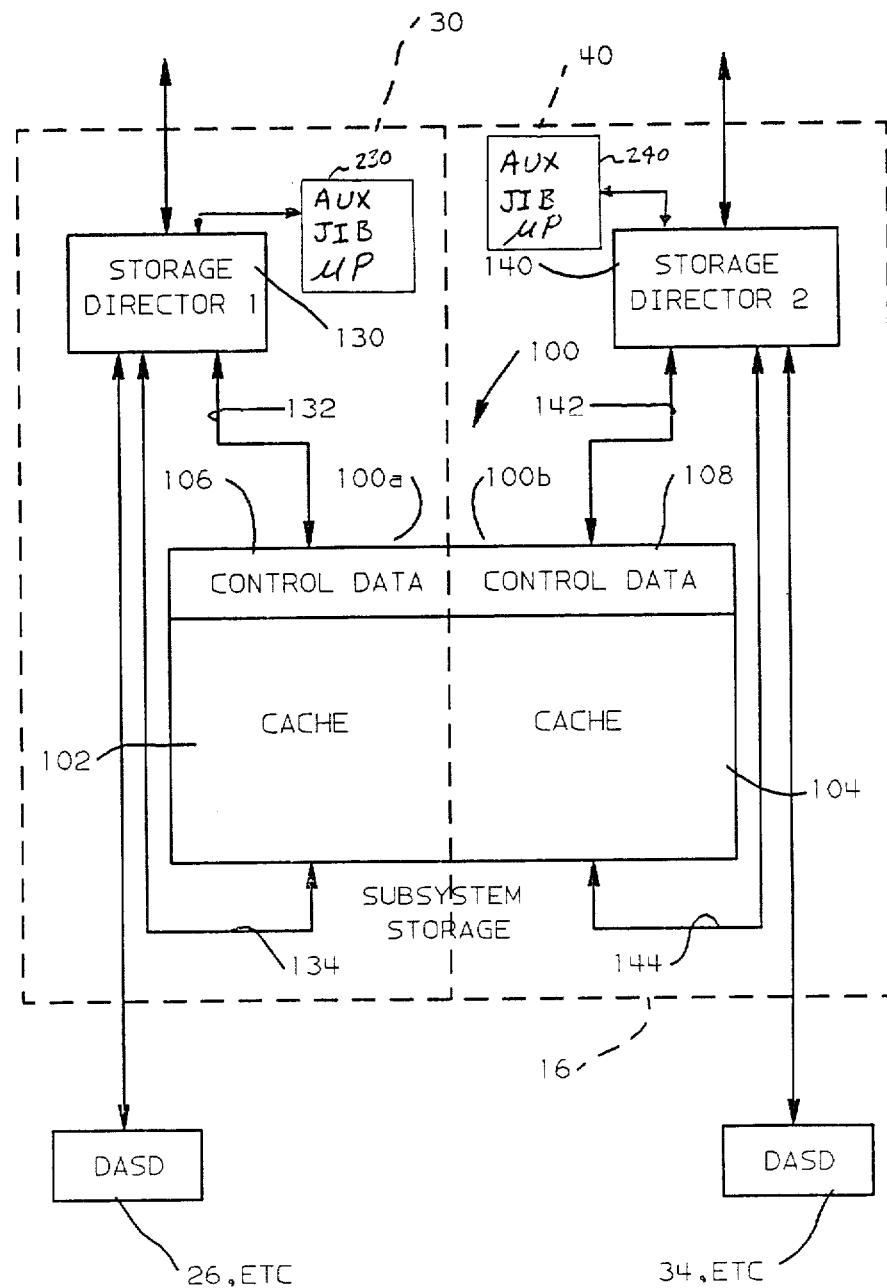
FIG. 2 is a block diagram of a peripheral subsystem embodying the method and apparatus according to the present invention.

Referring now to FIG. 2, the structure of control unit 16 will be described in greater detail. Control unit 16 includes two partitions 30 and 40, each having a storage director 130, 140, and a portion 100a, 100b of a subsystem storage 100. Subsystem storage 100 includes cache partitions 102 and 104 controlled by storage directors 130 and 140, respectively Control data areas 106 and 108 controlled by storage directors 130 and 140, respectively. Storage director 130 communicates with DASDs 26, 28, 32 . . . and storage director 140 communicates with DASDs 34, 36, 38 . . . (See FIG. 1.)

The operation of each storage director 130, 140 is controlled by a microcode control program resident within the storage director in conjunction with commands received through channel 14. From 92% to 98% of the subsystem storage is used for storing data. The remainder of the subsystem storage are the control data areas 106, 108. As best seen in FIG. 3.1 for area 106, each control data area 106, 108 in the respective partitions 30, 40, is divided into a number of table save areas and directory entry allocation units, as follows: Scatter Index Table (SIT) 110 (See FIG. 4), Modified Bit Map 114 (See FIG. 7), Track Modified Data 116 (See FIG. 8), Nonretentive Internal Command Chain save area 118 (See FIG. 9), and directory entry allocation units 120 (See FIG. 6). These directory entry allocation units provide efficient storage use for the different size data records that will reside in the cache. The allocation unit sizes are preferably established by a host 12 supplied command at initialization of the subsystem.

The subsystem initialization process which prepares or initializes the subsystem storage for record access operation includes locating the defective areas of the subsystem storage, defining control data structures required to support record access operations, allocating critical data in defect free subsystem storage areas, allowing limited processing (e.g. Read Initial Program Load (IPL)) before the subsystem storage has been initialized by the host, evenly distributing record slots throughout the subsystem storage to ensure record slots are equally affected by defective storage, and maintaining central information to reinitialize the subsystem storage without having to check the subsystem storage for defective areas The subsystem storage is prepared in two steps; firstly, the subsystem storage is made available to the subsystem during Initial Microprogram Load (IML) or by command from the host, and secondly, the subsystem storage is initialized by the subsystem responding to a command received from the host 12.

During IML or as the result of a "make-available" command received from the host 12, the partitions 100a, b of subsystem storage 100 are allocated respectively to a storage director 130, 140 and checked for defective areas. The subsystem storage is checked 32K (K=1000) bytes at a time. This checking is accomplished by writing a bit pattern to the cache 100a, b using the upper ports 132, 142 and then reading the pattern using the lower ports 134, 144 respectively for partitions 30, 40. The process used to find defective areas of storage is well known and will not be described in detail. A Defective Bit Map (DBM) 154 is maintained in control store 220 (FIG. 3.2) which is an integral part of each storage director 1 and 2. Each bit in the DBM 154 represents 32K bytes of the subsystem storage. If a permanent error is detected in a 32K byte section of subsystem storage 100a, b, the corresponding bit in the DBM is set to a defect indicating state.

Two defect-free megabytes of subsystem storage 100a, b (in cache 102, 104) are allocated to become a directory area 160. This allocation is required because errors detected accessing critical areas of the subsystem storage indicate potential data integrity problems. If two defect-free megabytes do not exist, the subsystem storage will be marked unavailable. During operation of the subsystem 10, when an error is detected in a critical area of the subsystem storage, the subsystem storage is made unavailable.

A single full track buffer 112 is allocated in each directory area 160 to allow buffered operations to take place when the subsystem storage is available, but not yet completely initialized. The cache is initialized based upon parameters specified by and received from the host. The directory 160 entries are allocated in the second of the two defect-free megabytes of subsystem storage, preferably beginning at a starting address of the record defect-free area.

During subsystem initialization, each directory entry 162n must be written. Other control tables and control information are partially completed for the cache. The initialization process (allocating only smallest record size in a largest size subsystem storage) can take 15 seconds. The Transaction Facility Processing software (see GH20-6200, supra) in a connected host processor 12 that supports record caching initializes each control unit serially. This means it should take 15 minutes to initialize an installation with 60 control units.

To reduce the initialization time, the allocation of record slots Sn are partially completed with the remainder being completed later from the idle loop. When an initialize command is received from the host processor 12, the parameters are verified and CHANNEL END is presented to the connected host processor 12. The Scatter Index Table (SIT) 110 and the control tables 114, 116, 118 are then initialized and the full track buffers 112 in the two control data area partitions 106, 108 are allocated from subsystem storage partitions 100a, 100b. Before presenting DEVICE END to the connected host processor 12, a restart table 210 is initialized containing information required to dispatch the initialization function from the usual idle loop (not shown), also termed idlescan as in U.S. Pat. No. 4,031,521 in its FIG. 1 to resume the partially completed record slot allocation (see FIG. 3.2). After CHANNEL END has been presented to the connected host processor 12 and before DEVICE END is presented for the initialize channel command, record access mode operations are allowed. If a required record slot size is required but is not available, Channel command retry (CCR) status is presented to the requesting host processor to allow the subsystem 10 to initialize some record slots 162n.

Each time the initialization microcode is dispatched from the idle loop after CHANNEL END was presented to the host processor 12, a predetermined number of additional record slots and entries are allocated. When all directory entries and record slots have been allocated, the initialization code resets a dispatch flag (not shown) and presents DEVICE END for each CCW that was presented with CCR status because a required record slot was not then available. The time taken by control unit 16 before presenting DEVICE END depends on the number of record slots currently allocated. This number is set such that the time to initialize (time until DEVICE END status is reached) will be no longer than 500 milli-seconds.

A scatter Index Table (SIT) 110 is used to locate records that are maintained in the cache 102. The SIT 110 is allocated at the end of the first of the two identified defect-free megabytes of data storage in subsystem storage 100a, 100b. 4096 subsystem storage words are allocated for the SIT 110 if the subsystem storage assigned to storage director 130 is 16 megabytes or less and 8192 words are allocated if the subsystem storage assigned to the storage director 130 is more than 16 megabytes. Each SIT 110 word contains seven entries plus an error correction code, such as shown in FIG. 4. Each entry in SIT 110 is a pointer to a directory entry 162n in cache 102. The SIT entry represents a physical address of a record and is calculated by the following hashing algorithm:

$$SIT\ offset = ((15*CC) + HH) + ((W/16)*D)$$

Where: CC=the hexidecimal representation of the cylinder; HH=the hexidecimal representation of the head; D=Device Number; and W=the total number of SIT words. The entry number in the SIT word is calculated as follows: entry position=R/7; where R is the Record Number. SIT 110 is initialized to indicate that cache 102 is empty of data.

The following described tables and save areas are allocated during subsystem initialization in the area preceding the SIT 110 in the directory area 160.

1. Modified Bit Map (MBM) 114 (FIG. 7)

The MBM contains a bit for each track of each possible DASD and is used to indicate that modified records may exist in the subsystem storage for the indicated track. The MBM is initialized to indicate that no modified data exists in the cache.

2. Track Modified Data (TMD) Table save area 116 (FIG. 8).

There is one TMD save area for each DASD and each is used to save information about modified records on a track when processing a buffered read (read multiple records). Multiple save areas are required because buffered read commands can be received for different DASDs while those DASDs disconnected or waiting for a SEEK/SET SECTOR interrupt to read records from DASD to the cache 102.

3. Internal Command Chain save areas 118 (FIG. 9)

There is one save area for each device and each is used to save command chains to write modified record in the DASD. Multiple save areas are required because internal command chains (ICC) can be built for different devices while the different DASD are respectively disconnected or waiting for a SEEK/SET SECTOR interrupt to write records from cache 102 to DASD.

The full track buffers 112 are each allocated in the subsystem storage area having addresses preceding the addresses for the control tables and save areas. When the buffers 112 fill cache 102 from the low control table and save area address to addresses less the control table and save areas addresses, so that address 0000 in cache 100a is reached before all buffers 112 are allocated, then the buffer 112 allocation resumes with the high half 170 of the cache 102 allocated to the storage director 130. A Buffer available Table (BAT) 152 is built in control store 220 to maintain information used to assign the buffers 112 to CCW's.

The record slots for storing data in cache 102 are then allocated using weighting factors determined by the host processor 12. An example of the allocation and the weighting factors is as follows:

| Record Size (bytes) | Assigned Weighting Factor |
|---|---|
| S1 = 381; | 1 |
| S2 = 1055; | 3 |
| S3 = 4096; | 5 |
| S4 = 0; | 0 |

Figure 5:
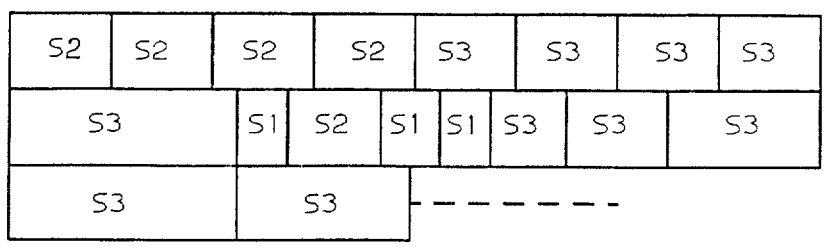
FIG. 5 is a map of record slot allocation in cache in accordance with the present invention.

An allocation of record slots in cache is in accordance with the above described weighting factors as shown in FIG. 5. The number of slots of the first size S1 specified by the first weight are allocated first. The number of slots of the second size S2 specified by the second weight are then allocated. This process continues for the third S3 and fourth S4 sizes. The process repeats when one allocation pass of all four sizes S1, S2, S3, and S4 has been performed. If the area at the beginning address of cache 102 allocated to storage director 130 was not used for full track buffers 112, the allocation of the record slots continues with the high half 170 of cache 102 allocated to storage director 130 when cache address 0000 assigned to the storage director 130 has been reached. Additional record slots continue to be allocated until the next record allocated would overlay the last directory entry. (See FIG. 3.1.) To save time during record slot allocation, record slots are added to a singly linked Free List corresponding to the record size instead of placing each entry in a doubly linked LRU chain by record size. An entry is moved from the Free List to the appropriate LRU chain or list when it is first used for storing data.

The DBM 154 (FIG. 3.2), which was built during make available processing, is used to determine if a buffer or record slot has been allocated in a defective area of subsystem storage. If the area is defective, the buffer or record slot is marked defective and will never be allocated. Since the record slots are distributed evenly throughout the cache, each record slot size receives the same impact when an area of the subsystem storage is defective. During record access operations, if a record slot or buffer is made defective, the corresponding bit for the 32K byte section of subsystem storage in DBM 154 is set to a defective area indicating state. Maintaining DBM 154 after initialization allows the host 12 to reinitialize the cache 100a, b (to change initialization parameters) without requiring that cache 100a, b be checked for defective areas.

The size of the cache can affect the performance of the subsystem. Obviously, the larger the cache, the more data it can store. Having more data stored in the cache increases the probability of finding the host processor 12 requested data stored in the cache.

TWO MODES OF OPERATION

Record access mode is the normal caching mode of subsystem operation. This mode is designed to improve the capabilities of the Transaction Processing Facility (See Information Manual GH20-6200 referenced above and incorporated herein). Transaction Processing Facility uses record access mode for all accesses to data stored within the subsystem. When the subsystem is operating in record access mode, the channel 14 transfers data directly to and from the cache 102, 104.

In direct mode, the control unit embodying the present invention operates using the S/370 and Extended Architecture versions of the software products sold by International Business Machines Corporation (hereinafter IBM) Multiple Virtual Storage/System Product (MVS/SP) (see IBM document SR23-5470, supra) and the Virtual Machine/System Product with High-Performance Option (VM/SP with VM/HPO) (see IBM document GC19-6221, supra). Direct mode accesses data directly (bypasses cache) on the DASD.

The present invention saves in the cache and on the DASD all data that is required by a user's application. It does not, however, permanently save information when the application does not require it. For example, a record containing a reservation transaction is fully protected (retentive data) while the record containing an inquiry (nonretentive data) on that same reservation transaction is not critical. The first type of data is called retentive data, and every update of this data is saved in the cache and protected by storage in a DASD. The second type of data is called nonretentive data and is kept for its useful life in the cache and is transferred to a DASD when required. Document incorporated by reference Ser. No. 426,367, filed September 29, 1982 shows storage of retentive and nonretentive data in a data storage hierarchy.

DYNAMICALLY MANAGED DATA

As the subsystem workload and the DASD activity change, the present invention dynamically manages the requested data. It uses a least recently used algorithm to keep high activity records in the cache longer than it keeps low activity records.

The present invention uses cache technology to significantly improve the performance of the Transaction Processing Facility program. The present invention provides fast and reliable access to necessary records. Using the cache, data is dynamically managed and DASD storage is more efficiently used. Combining the subsystem's cache and data management with the Transaction Processing Facility program provides an efficient hardware and software solution.

Rotational Position Sensing (RPS) misses are reduced because the device transfers records to the cache when ready and the cache then transfers records to the channel when the channel is available. Therefore, higher channel usage is possible because the channel transfer is not dependent on the known rotational latency of DASD.

RECORD ALLOCATION RATHER THAN TRACK ALLOCATION

Only the record requested is moved to the cache, rather than all data stored in a DASD track or part of a DASD track. This architecture optimizes the subsystem for the Transaction Processing Facility.

Record access mode has two operational submodes: record cache submode and buffer submode. Single record transfers that fit in the different allocation record unit sizes in the cache are transferred from the cache to the channel in record cache submode. Single records that are larger than the largest record allocation unit in the cache or multiple records are fully buffered and are transferred to the channel in buffer submode being stored in a track buffer 112.

Records accessed in record cache submode are retained in the cache. Records accessed in buffer submode are not retained in the cache.

Each control unit embodying the present invention has available a high-density electronic subsystem storage 100 that allows for 16, 32, 48 or 64 megabytes of random access electronic storage. Each storage director 130, 140 uses one-half of the total available subsystem storage. These subsystem storage sizes allow matching the present invention's performance to the user's requirements. The control unit can transfer records between the cache and the channel at the same time it transfers other records between the cache and DASD.

When the requested data is stored in the cache, the operation is called a "read hit", and the request is satisfied immediately. If the requested data is not stored in the cache, the data is moved to the cache from DASD before the completion of a LOCATE RECORD command. This type of read operation is called a "read miss". On each read miss, the storage director 130, 140 disconnects from the channel and accesses the DASD 26 etc. for the record and transfers it to the cache 102, 104. Then it reconnects to the channel and transfers the data from the cache to the channel. Later received requests from the channel read the data directly from cache 102, 104.

All write commands are preceded by DEFINE EXTENT and LOCATE RECORD commands. Then, when the storage director 130, 140 receives a write command, the storage director transfers the data from the channel 14 to the cache 102, 104. Then, while disconnected from the channel, the storage director transfers the data from the cache to DASD. During the cache to DASD transfer, the channel is free for other data processing activities.

Operating in direct mode, the channel 14 accesses the DASD 26 without involving the cache 102; the channel 14 works directly with a DASD 26, etc. Direct mode is normally used for maintenance and formatting an individual DASD but can also be used to access data.

The Transaction Processing Facility Program Version 2.3 supports the preferred embodiment in either the record access mode or direct mode. Transaction Processing Facility always uses record access mode when it is available.

In direct mode, the present invention is designed to run under the S/370 and Extended Architecture versions of one of the following software products sold by IBM: MVS/SP Version 1 Release 3.3 (S/370) operating system and the Data Facility Product Release 1.1; MVS/SP Version 2 Release 1.2 (XA) operating system and the Data Facility Product Release 1.2; or Virtual machine/System Product with High Performance Option (VM/SP with VM/HPO).

The command set of the subsystem supports the count, key, and data (CKD) architecture used for IBM disk storage operations. Both storage directors 130, 140 retrieve data from or store data in a DASD 26 or in a cache 102, 104. A subset of the CKD architecture supports the data stored in the cache.

Five channel commands control the cache 102, 104: PERFORM SUBSYSTEM FUNCTION, DISCARD RECORD, SET SUBSYSTEM MODE, SENSE SUBSYSTEM STATUS, and SENSE SUBSYSTEM COUNTS The DEFINE EXTENT command is a channel command that communicates special data to the data storage hierarchy. This command allows a host system to vary the cache management algorithms to enhance the performance of applications that have different access patterns The DEFINE EXTENT command can activate the record cache submode for retentive data, for nonretentive data, for inhibiting cache loading and for buffer submode.

The subsystem 16 attaches to the families of IBM host processor systems including 3031, 3032, 3033, 3041 Attached Processors, 3042 Attached Processor Model 2, 3081, 3083, 3084, 3090 (Models 200 and 400), 4341, 4381, and 9190. The preferred embodiment can attach up to two full strings of DASDs (up to 32 device addresses with each storage director using a maximum of 16 unique addresses for DASDs). Read and write operations are at 3.0 megabytes per second. The subsystem provides for the attachment of two channels to each storage director.

OPERATION OF A PREFERRED EMBODIMENT OF THE PRESENT INVENTION

Referring now to FIG. 11, the method for locating modified records on a track in accordance with the present invention will be described.

A 256 byte record number storage array in the track modified data (TMD) table (FIG. 8) is first cleared in step 300. Next, in step 301 the cache control block CCB (not shown) is tested to determine if any modified records have been written to a particular DASD, i.e. one that has been identified by either a host processor 12 or internally by a control unit 16 via a usual replacement control (not shown). If no modified records have been written to DASD the process is exited at exit 302.

Next, at step 303 a modified bit map table (FIG. 7) is examined to determine if any modified records have been written to the identified track. If a bit is found in the modified bit map table that has been set to the modified indicating state, a scatter index table (FIG. 4) word for that identified track is read. If no bits are found in the modified bit map table for the identified track, the process is exited at exit 302. Assuming that a modified bit map table bit is found for the identified track and the scatter index table word was read at step 304, the scatter index table word is then examined at step 306 for entries pointing to a directory entry stored in cache. If no such directory entry pointers are found in the scatter index table word, the process is exited at step 302.

When a directory entry pointer is found in step 306, the particular directory entry in cache pointed to is then read at step 307 and checked at step 308 to make sure that the directory entry (D.E.) is for the same physical address (that is the same DASD (device), cylinder (CC) and head (HH)) as has been identified previously by the modified bit map table examination. If a directory entry is not for the same physical address, a test is made at step 310 to determine if all directory entries have been read. If all directory entries have been read, then the process is exited at exit 302. If there are additional entries to be read, the next directory entry pointed to by a particular scatter index table entry is read at step 307 and the process continues as above described. If at step 308 it is determined that the directory entry is for the particular physical address, a test is made at step 311 to determine if the record stored in cache is modified. If the record stored in cache is not identified as a modified record, again a test is made in step 310 to determine if all directory entries have been read as above described. If the record stored in cache is identified as a modified record, information pertaining to the modified record is stored at step 312 in an eight byte entry (such as in the "TMD" entry for device 0, bytes 8-15 as TMD Information Entry 2) in a 100 entry portion (HEX 000 to HEX 037) of the track modified data table (FIG. 8). At step 313, after the record information is stored as an eight byte entry in the TMD table array, the index (such as HEX 000 for entry) into the 100 entry portion is stored in the record number position (HEX 000 for entry 2) of the 256 byte array cleared in step 300 where there is one byte in the array just cleared corresponding to each possible record number in an eight bit byte, that is, record 28 numbers 0-255 inclusive. After the track modified data tables have been set as above described with information relative to the just processed modified record stored in cache, the next word in the scatter index table word is examined and the process continues until all modified records on the identified track have been examined and identified with corresponding entries being made in the track modified data table. The above described process may be repeated for each track of each DASD in the subsystem.

STATUS PRESENTATION IN RECORD ACCESS MODE

To determine when status needs to be presented to host processor 12 and whether it is suppressible or unsuppressible (see IBM document GA22-6974, supra), two doubly linked lists for each interface are kept (one for suppressible status and one for unsuppressible status) for each DASD resulting in a total of 16 lists. If there is an entry on one of the lists, the REQUEST IN tag line is activated for that channel interface.

CHANNEL COMMAND RETRY (CCR) ALGORITHM FOR RECORD ACCESS MODE (See GA22-6974, supra)

The following commands will be CCR'd: Initialize command when the buffer is currently allocated (DEVICE END will be presented when the buffer is freed). A CCR is sent for a BUFFERED READ command when the stage of the data to cache fails and an Internal Command Chain (ICC) was requeued to retry the stage (move data from DASD to cache) operation (DEVICE END is presented when the ICC completes). Internal Command Chains (ICC) having internal command words (ICW) are described in U.S. Pat. No. 4,533,955 (filed as Ser. No. 289,632, filed Aug. 3, 1981), said patent is incorporated herein by reference (see Ser. No. 426,367, pg. 17, supra). A CCR is sent to the host for the DEACTIVATE by DASD, DISCARD, and COMMIT (see Ser. No. 426,367, pgs. 17 and 23, supra) commands, whenever the nonretentive ICC area for that DASD is in use (DEVICE END will be presented when the nonretentive ICC for the addressed device completes). The term nonretentive ICC refers to ICC's use to move data between cache 100 and a DASD for nonretentively stored data (see Ser. No. 426,367, supra). A CCR is also sent to the host processor for SEEK and Buffered READ/WRITE commands, if there currently is no track buffer available (DEVICE END will be presented when a track buffer becomes available). A CCR is also sent to the host processor for cached READ/WRITE commands, if a directory entry is required and there are no directory entries on the Free list and the bottom least recently used entries on the active list for the record size identified in the received command are busy or modified (DEVICE END will be presented when a record slot of the required size changes state (e.g. a modified bit is reset). A CCR is sent to a command supplying host for cached WRITE commands, if a nonretentive ICC for the addressed device or DASD is already built for the same track and the cache copy of the record is modified (DEVICE END will be presented when the destage is complete—the priority for dispatching asynchronous destages is moved ahead of the priority for channel operations until the nonretentive ICC completes). A CCR is sent to a host 12 for the buffered WRITE commands, if a nonretentive ICC for the addressed DASD is already built for the addressed track (DEVICE END will be presented when the nonretentive ICC for the addressed DASD completes—the priority for dispatching asynchronous destages (move data from cache 100 to a DASD) is moved ahead of the priority for channel operations until the nonretentive ICC completes), and for FORMAT WRITE commands, if modified data may exist for the addressed track (CCC, HH) and the nonretentive ICC area for the addressed DASD is currently in use (DEVICE END will be presented when the nonretentive ICC for the addressed device or DASD completes—the priority for dispatching asynchronous destages is moved ahead of the priority for channel operations until the nonretentive ICC completes)

SCAN FOR LRU MODIFIED DATA TO BE DESTAGED

As cache entries containing modified data reach the bottom of the LRU lists (become least recently used), the data identified by the cache entry needs to be destaged to DASD for allowing room for storing more data (replacement). This replacement function is dispatched from the idle loop when its counter (not shown) reaches zero. Each time the idle loop is entered, the idle loop counter (not shown) is decremented by one. The idle loop counter was set to an "init-value" each time the LRU scan function returns control to the idle loop. The "init-value" is dynamically increased or decreased to tune how often the LRU scan function gets invoked. Whenever subsystem storage is (re)initialized, the "init-value" is reset to the initial value.

When the LRU scan function is invoked, the LRU lists are scanned by rows to find indications of modified data stored in cache 100. A row consists of the next oldest entry from each LRU list. When a modified track is found, an entry is built in a LRU Destage Queue (not shown) if a nonretentive ICC is not already built for the track and the track is not already in the LRU destage queue. The scan continues until eight entries have been added to the queue or until 36 entries have been scanned. If the queue contains six entries when the LRU scan function is called by the idle loop, the LRU destage queue is not rebuilt and control returns back to the idle loop. If the queue contains fewer than six entries when the LRU scan function is called, the entire LRU destage queue is rebuilt.

If no modified entries are found on any of th LRU lists, the LRU destage function is being called too often. Then, the "init-value" is incremented by 256. If priority had been given to dispatching asynchronous destages and building an ICC for LRU destages, the priority is switched back to channel operations. If any modified entries are found in an LRU list, the LRU destage function is being called the right amount. No adjustment is made to the "init-value". Then RDQ (read queue) and LRU Destage Queue to build nonretentive ICC's to destage the tracks containing the modified entries are built.

If when allocating a new directory entry, the new LRU entry is found to identify modified data, the LRU destage function is not being called often enough. The "init-value" is reset to the initial value. The idle loop counter is reset, so that idle loop will invoke the function as soon as possible. Priority is given to ICC processing for asynchronous destage and build ICC for LRU destage.

DESTAGE MODIFIED DATA BY TRACK

This algorithm is used to destage LRU identified modified data from the idle loop, when doing a COMMIT (commit non-retentive data to become retentively stored data, see Ser. No. 426,367, supra) by extent, a Schedule DASD Update, a format WRITE with modified data on the track, or a DEACTIVATE by device operation.

The SIT 110 is searched to identify all the modified records on one track, i.e. the track currently being processed. All the modified records on the current track will be destaged in one ICC. The necessary central information to construct the ICW's for each record is built in the TMD table 116. The SEEK and SET SECTOR ICW's are constructed in the device's nonretentive ICC area in control store. The TMD table 116 is used to access the record slot header to get the sector number for the first record to be destaged. The SEARCH RECORD, CONTROL WRITE DATA, and WRITE DATA ICW's for each record to be destaged are constructed in the addressed DASDs assigned nonretentive ICC area in subsystem storage using information from the TMD table. The TMD table 116 is used to determine the length for each record. If the record length is not in the TMD entry for the record, the record slot header is accessed.

When the ICC is to be initiated, the SEEK/SET SECTOR portion of the nonretentive ICC is started. When the DASD interrupt from the SET SECTOR is received by the control unit 16, the cache portion of the nonretentive ICC is copied to the active nonretentive ICC area and chained to the SET SECTOR ICW. After the ICC completes, the directory entry for each record destaged is marked not modified and the bit in the MBM entry for the track is reset. If concurrent operations are active, this cleanup function is queued up to be dispatched from the idle loop.

RECORD ACCESS DEVICE FUNCTIONS DISPATCHED FROM IDLE LOOP (RDQs)

When scanning in the idle loop, resets and selections are allowed and no concurrent operations are in progress. There are six Record Access Device Dispatch Queues (RDQs) used to determine which of six functions are to be dispatched, and to record the order the requests for dispatching were received If there is an entry in a given RDQ, that function represented by the given RDQ is called from the idle loop Further checking may be done by the called function to ensure all conditions are met before actually starting the called operation. If all conditions are not met, that function returns to the idle loop, and the algorithm described below is performed by the storage director. The following description defines the six functions for record access mode and the priority order in which they are normally dispatched from the idle loop.

1. Redispatch Synchronous Function RDQ

This function is dispatched from idle loop after an ICC has completed for the function and the function has additional work to do before DEVICE END is to be presented, (e.g., as for COMMIT record operations) to host processor 12.

2. Dispatch ICC Processing for Channel Operation RDQ

This function initiates ICC's for channel operations. If the addressed device was busy, the next entry on the Channel Operation RDQ is checked. If all requested devices are busy, this function returns to idle loop. This function is dispatched for the following three types of operations. A stage operation is initiated for a single or buffered READ operation. A stage operation consists of transferring data from the addressed device (DASD) to the cache while the subsystem is disconnected from host processor 12 during execution by the subsystem of the LOCATE RECORD or SEEK channel command and before the data is passed on to the channel 14 for the host processor 12. The end of chain (see U.S. Pat. No. 4,533,955, supra) processing for the ICC is always done when the ICC completes, since any directory maintenance is done after the READ command(s) are processed. A writeback operation performed for a COMMIT record, buffered WRITE, or retentive WRITE channel commanded subsystem operation. A writeback operation consists of transferring data from the cache 100 to the addressed DASD while the subsystem is disconnected from channel 14 and host processor 12, after the data has been received from channel 14. In the case of the COMMIT record operation, the data was written to cache 100 during a previous channel-related operation. Destage of modified records as performed for a COMMIT by extent, DEACTIVATE by device, or format WRITE operation. A destage of modified records operation consists of transferring data stored in the cache to the addressed device while the subsystem is disconnected from channel 14, a track at a time. (See "Destage Modified Data by Track" algorithm, supra.) The data was written to cache during a previous channel 4 related operation(s). The addressed DASD's nonretentive ICC area is marked reserved during this destage operation. To prevent other subsystem operations from using this addressed DASD's nonretentive ICC area until the channel command supplied by host processor 12 is completed by subsystem 10.

Dispatch ICC Processing for Asynchronous Destage RDQ

This function initiates ICC's or start cleanup processing that was not done right away because concurrent operations were in progress. This function is dispatched for nonretentive ICC's built to destage modified data for LRU or Schedule DASD Update operations. If the addressed DASD is busy, the next entry on the Asynchronous Destage RDQ is checked. If all DASDs listed in this RDQ are busy, this function returns to idle loop 4. Build ICC for LRU destage RDQ This function builds an ICC to destage modified records whose LRU identifications are located logically adjacent the least recent usage end (bottom) of the LRU list. (See "Scan for LRU Modified Data to be Destaged" algorithm.) If the nonretentive ICC area for the addressed DASD is in use, the next entry on the Build ICC for LRU Destage RDQ is checked. If all the required areas to execute items listed in this RDQ are currently in use, this function returns to idle loop.

5. Build ICC for Schedule DASD Update RDQ

This function will build an ICC to destage modified records for a Schedule DASD Update operation. If the nonretentive ICC area for the device is in use, the next entry on the Build ICC for Schedule DASD Update RDQ is checked. If all required areas are currently in use, this function returns to idle loop.

6. Dispatch Directory Functions RDQ

The directory functions include invalidating directory entries caused by a received DISCARD by device channel command; invalidating directory entries due to a received DEACTIVATE by device channel command; and moving pinned-retryable entry indications in the LRU list to the top of LRU list (to be most recently used or MRU) due to a pack change interrupt from a DASD.

A list within the directory 160 is maintained for each DASD that indicates which function is to be dispatched with respect to each DASD. If all of the entries are zero, there was no work to do for the indicated DASD and the DASD's entry in the Dispatch Directory Function RDQ is removed. The priorities for dispatching from the idle loop asynchronous destages and building an ICC for LRU destage may be moved ahead of the priority for channel operations temporarily in two situations: firstly, when directory 160 entries identifying modified records stored in cache get to the bottom of an LRU list (in this case, priority for both the asynchronous destages and building an ICC for LRU destage is moved ahead of the priority for executing channel operations; and secondly, when waiting for the nonretentive ICC area because of a CCR'd WRITE operation (in this case, only priority for asynchronous destages is moved ahead of the priority for executing channel operations).

CONCURRENT OPERATIONS

During data transfers, if there is status to present or to allow selections, between DASD and cache, a Device "mini-scan" is entered to raise REQUEST-IN'S for host processor 12 via channel 14 in order to initiate concurrent processing. During data transfers in order to initiate concurrent processing between the channel 14 and cache 100, a channel mini-scan is performed to look for DASD supplied interrupts or directory operations.

A semi-synchronous operation is defined as data being transferred from an addressed DASD to a full track buffer 112; then when at least one record has been stored in a buffer 112, the stored data may be then transferred to channel 14 for host processor 12. Records may continue to be read from the addressed DASD into the track 112 buffer while previously read records are being simultaneously transferred to channel 14. There is at least one record stored in buffer 112 to be transferred to the channel at all times.

Semi-synchronous operations may be performed for SEEK or buffered READ operations. Before initiating a semi-synchronous operation, the modified bit map 114 is checked to see if any modified records may exist in cache for the indicated track. If so, the TMD information area 116 is built during execution of the SEEK or LOCATE RECORD channel command and is kept in subsystem storage. The full TMD is reconstructed in control store 220 during the first executed READ channel command, and used to determine whether the data stored in buffer 112 or the data in the record slot Sn is to be transferred to the channel for each subsequent READ command received from host processor 12 via channel 14.

An auxiliary microprocessor 230, 240 (AUX JIB) saves the record number R of the first record and compares it with the record number of subsequent records, to ensure that no more than one track will be read into the buffer 112 during the chain of commands including said READ commands. The AUX JIB 230, 240 also checks the record lengths to determine if the lengths match the length given in the immediately preceding DEFINE EXTENT channel command for the addressed DASD.

When the SET SECTOR interrupt is received from the addressed DASD, the DEVICE END tag signal for the SEEK or LOCATE RECORD channel command is posted for presentation to host processor 12 via channel 14. If the channel 14 reconnects to host processor 12 before all the records are staged into buffer 112 from the addressed DASD, the operation continues as a semi-synchronous operation. If other channels (not shown) are selected during mini-scan, this operation may finish without becoming semi-synchronous.

AUXILIARY MICROPROCESSOR (AUX JIB) ALGORITHMS

After a channel 14 reconnection to host processor 12 due to a SET SECTOR DASD supplied interrupt, the auxiliary microprocessor (AUX JIB) searches for the count field included with the received READ or WRITE channel command. When it is found, the AUX JIB checks the record length RL. For READ channel operations, the record length must not exceed the length previously given in the immediately preceding DEFINE EXTENT channel command for the addressed DASD. For WRITE operations, the record length must match the length given in the immediately preceding DEFINE EXTENT channel command. When a buffered READ channel operation is received via channel 14, the records stored in an addressed DASD will be staged into a buffer 112. The mechanism to ensure that the buffer 112 is not overwritten if there are too many READ commands in the chain is as described below. As records are READ from the addressed DASD, each count field is read into the AUX JIB, as well as the data transfer circuits of a storage director (see U.S. Pat. No. 4,533,995). The AUX JIB 230 saves the first count field and compares its stored DASD cell number (rotational position of disks in DASD 26, et al) to the cell number in all subsequent count fields. If AUX JIB 230, 240 detects a match, the entire addressed track has been read, the READ channel command executions are stopped. The AUX JIB 230, 240 also checks record lengths to ensure that the record lengths do not exceed the one given in the immediately preceding DEFINE EXTENT channel command.

When a buffered UPDATE WRITE channel command operation is to be executed, the following described mechanism is used. As the records being written to the addressed DASD are processed, the data fields are written to the addressed DASD and the count fields are also read into the AUX JIB 230, 240, as well as the record control unit. The AUX JIB 230, 240 saves the record numbers in the addressed DASD entries of the Records Written Table (RWT) (not shown), located in the AUX JIB's own control store (not shown).

The storage director 130, 140 uses RWT to build a Track Modified Data (TMD) table, which in turn is used to invalidate all the records stored in cache 100 and just written to DASD. The AUX JIB also checks record lengths to determine if the record lengths match the record length given in the immediately preceding DEFINE EXTENT channel command for the addressed DASD.

MODIFIED BIT-MAP (MBM) ALGORITHM

The MBM 114, located in subsystem storage, stores on a track basis (for each DASD) whether there has been any nonretentive data for each track that is stored in cache 100. When a nonretentive WRITE command is received, and a modified entry does not already exist in cache 100, the bit corresponding to the DASD track storing the record is set. When a FORMAT WRITE channel command is received, the bit in MBM 14 for the addressed track is checked. If any modified records exist for the addressed track, such records are destaged to the addressed DASD before the FORMAT WRITE command operations occur with the addressed DASD. After the FORMAT WRITE operations complete, all directory entries for that track in cache 100 are invalidated. When a SEEK or buffered READ channel command is received via channel 14, or when processing a COMMIT by extent channel command, a Schedule DASD Update channel command, or a DEACTIVATE by device channel command, the bit in MBM 114 for the addressed track is checked. If the bit is set, the Track Modified Data (TMD) table is built indicating all the modified records of the addressed track that are stored in cache 100 and not yet recorded in the addressed DASD. When data stored in cache 100 for a given track is destaged (written to) DASD, the bit in MBM 114 for that track is reset if all the modified records stored in cache for that track are destaged; i.e., there are no pinned or defective entries remaining for that track and a nonretentive write was not received for that track while the destage operation was in progress. After the directory 160 entries for the records for a track stored in cache 100 are invalidated for a DISCARD by device or DEACTIVATE by device command, the MBM 114 bit for that track is also reset. Because of the DISCARD record and COMMIT record channel commands, the bit in MBM 114 for a track may be set, even though no modified records exist in cache 100 for the addressed track.

DEFECTIVE BIT-MAP (DBM) ALGORITHM

DBM 154 (FIG. 3.2) has one bit for each 32K byte area of subsystem storage to indicate whether that area is defective or not. A DBM 154 bit for a 32K area is turned on or set if either a 32K area is determined to be defective during the IML or Make Subsystem Storage Available functions, or a record slot Sn in the 32K area becomes defective, or a buffer 112 in the 32K area becomes defective.

DIAGNOSTIC MODE SWITCH ALGORITHM

The diagnostic mode switch for a storage director 130, 140 is set by a maintenance or customer engineer when running diagnostics on the subsystem. The microcode of the storage director 130, 140 checks the switch each time the idle loop is entered. If the switch is set, the cache is made unavailable and all ICC's are aborted.

DIRECTORY ALGORITHMS

The cache 100 is divided equally between the two storage directors 130, 140. Storage director 130 gets the low half of cache and storage director 140 gets the high half. Each storage director figures out its cache assignment by examining the "SD Indicator" bits in its CSTAT4 common register (common to both storage directors and not shown). The size of the cache is determined by the "Storage Size Switches" manually set by the installer into the GSSCIN general register (not shown). The following items pertain to each storage director and its own half of the cache, without consideration to the other storage director or its half of the cache.

The cache is checked for 32K defective areas when it is first made available for use by a storage director. Two contiguous defect free one megabyte areas are located for the "Directory Area" 160 when the cache is first made available. If two such areas are not found, the cache is not made available. The first and last word of the subsystem storage for each storage director is reserved for maintenance procedures called RAS. The SIT 110 is allocated at the end of the first defect free megabyte area of the defect free pair of megabyte areas. The Modified Bit-Map 114 is allocated prior to the SIT 110. The nonretentive ICC areas 118 (FIG. 9) for each device are then allocated prior to allocating the Modified Bit-Map 114. The Track Modified Data (TMD) information areas 116 for each DASD are also allocated prior to allocating the nonretentive ICC areas 118. The directory 160 is built starting at the beginning of the second megabyte of the defect free pair of megabyte storage areas in subsystem storage 100.

The buffers 112 are then allocated, starting from the beginning or top of the first TMD table (FIG. 8) and working back towards the start or lowest address of the cache 102, 104. The first allocated buffer 112 will always be allocated in the first megabyte area of the defect free pair of megabytes. The generated buffer allocation information is maintained in a table in control store of the storage director 130, 140.

The record slots Sn are then allocated, starting at the subsystem storage 100 address where the last buffers 112 allocated address. When the beginning or lowest address of the cache 102, 104 is reached, allocation continues by wrapping the allocation to the bottom or highest address of the cache and allocating to decreasing addresses towards the directory 160 highest address. The record slots are doled out according to the record size ratios defined in the PERFORM SUBSYSTEM FUNCTION (PSF) initialize channel command, i.e., so many of the first size S1, followed by so many of the next size S2, etc., then repeating this sequence until the directory highest address is reached by an allocation. As each record slot Sn is allocated, its corresponding directory 160 entry is allocated and initialized. Hence, the directory grows in the cache 102, 104 towards the allocated record slots Sn as the record slots are allocated at decreasing addresses towards the directory highest address All buffers and record slots that fall in a defective 32K area will be marked defective. All nondefective record slots will be placed on the Free list for its record size.

There are separate directory LRU lists for each of the record sizes specified in the PSF command. Directory entries are allocated to records from the free list and made MRU on the active list when the ensuing data transfer completes. When there are no free directory entries, the first LRU entry that is not modified and not busy is allocated for the record to be cached. If "inhibit cache loading" is indicated and the requested record is not stored in cache 100, the directory entry is put back on the free list instead of being made MRU.

When processing a DISCARD channel command or DEACTIVATE by device channel command, the directory 160 is physically scanned to invalidate all entries for the addressed DASD. A physical scan of the directory examines each entry sequentially, starting with the first directory entry and progressing toward the end of the directory. This scan ensures that all entries for the addressed DASD are found, since other subsystems operations may alter the order of the various hash chains and directory lists. Existing entries are set busy, and new entries are allocated and set busy, while the subsystem is connected to the channel. The busy indicator for an entry is kept in the CCB. Only one entry can be busy for a DASD at a given time. Directory entries are made MRU concurrent with the data transfer, if possible. Otherwise, they will be made MRU after DEVICE END has been presented to host 12 during end-of-chain processing.

The Scatter Index Table (SIT) 110 (FIG. 3.1) consists of SIT words Each SIT word contains seven SIT entries. Each SIT entry is two data storage bytes and, if the entry is valid, contains the address of a directory entry. An address of 0000 indicates end of chain of SIT entries.

To hash (access by hashing) to a SIT entry, the storage director 130 multiplies the cylinder address (CC) by the number of heads (15) per cylinder, then it adds the head address (HH) to the product to create a first sum. Then a device offset (the device offset is the device number times 1/16 of the total number of SIT words) is added to the first sum to create a second sum. The second sum is divided by the number of SIT words and the remainder is then offset to the SIT word from the beginning (lowest address) of the SIT. Divide the record number by seven and add it to the remainder to get the SIT entry address.

The channel command set includes CCWs which permit the attached host 12 to pass information to subsystem 10 about the nature of the current channel program and indications of future uses of the blocks of data referenced by the channel program. The subsystem 10 may use these usage attributes to alter its internal algorithms; for example, use of the buffer submode attribute for the DEFINE EXTENT command indicates that this reference should result in a buffered data access rather than a cached data access.

INPUT/OUTPUT OPERATIONS

Input/output operations, initiated by I/O instructions in the host processor 12 system control program (SCP), are controlled by channel commands retrieved from host processor 12 internal storage, by the channel 14. Arithmetic and logical operations (not shown) are performed while the host processing unit 12 is in the problem state; for I/O operations, the host processing unit 12 must be in the supervisor state The host processing unit 12 is changed from problem to supervisor state when a supervisor call instruction is executed or when an I/O interrupt occurs. The status of the system at the time of the change is stored in the program status word (PSW). In the supervisor state, the processor executes I/O instructions differently depending on its type of system architecture. For a detailed description of the formats and functions provided, see the appropriate Principles of Operation manuals IBM System/370 Principles of Operation, GA22-7000, or IBM System/370 Extended Architecture Principles of Operation, SA22-7085.

After successful execution of an I/O instruction in host processor 12, the channel 14 independently selects and governs the storage directors 130, 140 and the DASDs 26, 34 that are addressed by the instructions, respectively. Reserved host processor 12 internal storage locations contain information and instructions that enable the channel 14 to do those functions necessary to complete the operation. A detailed description of the channel address word, channel command word, channel status word, and program status word can be found in the IBM System/370 Principles of Operation, GA22-7000. A detailed description of the operation request block and the interruption response block can be found in the IBM System/370 Extended Arhitecture Principles of Operation, SA22-7085.

The Read Count, Key, and Data channel command transfers the count, key, and data areas of a record from the addressed device or cache to the channel. In the direct mode there are no command chaining requirements. In record access mode, this channel command must be preceded by a Seek or Locate Record channel command. In record access mode, this command must be executed in buffer submode of record access mode. If it is not, it is rejected with unit check in the ending status.

In the direct mode, the count, key, and data areas of the record read by this command are from the next record (excluding RO) found on the addressed track as if no cache were present.

In record access mode, the Read Count, Key, and Data command is processed in the buffer submode of record access mode. If this command is received in a command chain that is not operating in buffer submode, it is rejected with unit check in the ending status. The blocksize value from the preceding Define Extent command must be greater than or equal to eight plus the sum of the key length and data length of the record accessed If it is not, the channel program is rejected with unit check in ending status. The storage director 130, 140 determines if a modified data area exists in cache for the accessed record. If a modified data area exists in cache, the count and key areas are transferred from the buffer allocated by the preceding Locate Record or Seek command to the channel and the data area is transferred from the cache slot to the channel. If a modified data area does not exist in cache, the count, key, and data areas are transferred from the buffer allocated by the preceding Locate Record or Seek command to the channel. When processing for the Read Count, Key, and Data command completes normally, channel end and device end are presented in ending status.

The Read Data command transfers the data area of a record from the addressed DASD device or cache to the channel. In direct mode, there are no command chaining requirements. In record access mode, if the command has not been chained from a Read IPL, Locate Record, or Read Data command it is rejected with unit check in the ending status. The Read Data command is processed in either record cache submode or buffer submode as determined by the preceding Define Extent command.

In the direct mode, the data area read by this command is either the data area of the record following the next count area (excluding RO) met on the track or the data area of the record that has been chained from the count or key area of the same record. For example, if a Read Data is chained from a Space Count, Read Count, a search ID- or search key-type command, the data area is from the record accessed by the previous command.

In the record access mode, this command is processed in either record cache submode or buffer submode as determined by the preceding Locate Record command. In the record cache submode, the blocksize value from the preceding Define Extent command must be greater than or equal to the data length of the record accessed. If the record exists in cache, the blocksize value must be greater than or equal to the data length of that record, otherwise the blocksize must be greater than or equal to the data length of the record on the DASD. If the blocksize is not greater than or equal to the data length of the record to be accessed, the channel program is terminated with unit check in the ending status. The data area is transferred from a cache record slot to the channel, at that time, CHANNEL END and DEVICE END are presented to the channel 14. If the preceding Define Extent command specified the Inhibit Cache Loading attribute and a new record slot was allocated for this access, the record slot is de-allocated. If the preceding Define Extent command specified the Inhibit Cache Loading attribute and the record exists in the cache, th record slot position on the least recently used (LRU) algorithm list remains unchanged.

In the buffer submode, the blocksize value from the preceding Define Extent command must be greater than or equal to the data length of the record accessed. If it is not, the channel program will be terminated with unit check in the ending status. The storage director 130, 140 determines if a modified data area exists for the accessed record. If a modified data area exists in cache, the data area is transferred from the cache slot to the channel. If a modified data area does not exist in cache, the data area is transferred from the buffer allocated by the preceding Locate Record command to channel 14.

The Read Home Address command transfers the home address area from the address DASD to main storage of host processor 12. There are no chaining requirements. In the direct mode, after presenting initial status, the five bytes of home address (FCCHH) are transferred from the addressed DASD to host processor 12. CHANNEL END and DEVICE END are presented to the channel 14 at the completion of the operation. If a data overrun or data check is detected during the execution of this command, the storage director attempts recovery with command retry. If command retry is unsuccessful, CHANNEL END, DEVICE END, and unit check status is presented to channel 14. In record access mode, this command is rejected with unit check, channel end, and device end in the status.

The Read IPL command causes the addressed DASD to seek to cylinder 0, head 0, and read the data area of record 1. In direct mode, the Read IPL command cannot be preceded by a Space Count, or Set File Mask command in the same chain. In record access mode, this command must be followed by a Read Data command. Both commands must be present and no other commands are permitted to be in the same command chain.

When the command chain is operating in record access mode, this command is executed in the buffer submode of record access mode. Before presentation of initial status, the storage director allocates a buffer for use during this command chain. The first two records following record zero on cylinder 0, head 0 are read into the buffer. The data area for the first record following record zero is transferred to the channel. Channel end and device end are presented to the channel on completion of the channel program.

The Read Key and Data command transfers the key and data areas of a record from the device or cache to the channel. In direct mode, there are command chaining requirements. In record access mode, this command must be executed in buffer submode of record access mode and chained from (follow) a Locate Record command. If it is not, it is rejected with unit check in the ending status. In the direct mode, the key and data areas read by this command are either the key and data areas of the record following the next count area (excluding RO) met on the track or the key and data areas of the record specified by a CCW that has been chained from the count area of the same record. For example, if a Read Key and Data command is chained from a Read Count, Space Count, or search ID-type command, the key and data areas are from the record accessed by the previous command. In the record access mode, the blocksize value from the preceding Define Extent command must be greater than or equal to the sum of the key length and data length of the record accessed. If it is not, the channel program is rejected with unit check in ending status. The count, key, and data fields are transferred from the addressed DASD to a buffer 112. The storage director 130, 140 determines if a modified data area exists in cache for the accessed record. If a modified data area exists in cache, the key area is transferred from the buffer allocated by the preceding Locate Record command to the channel and the data area is transferred from the cache slot to the channel. If a modified data area does not exist in cache, the key and data areas are transferred from the buffer allocated by the preceding Locate Record command to the channel. When processing for the Read Key and Data command completes normally, channel end and device end are presented in ending status.

The Read Multiple Count, Key, and Data (CKD) command transfers the next record met (excluding RO) and all remaining records on the track from the address device to the channel. There are no chaining requirements. Initial status is normally zero Channel end and device end are presented after the last record on the track has been read. In the direct mode, this command provides a means of reading all the records on a track during a single disk revolution. It is similar to executing a chain of Read CKD commands that read records into contiguous main storage locations. Reading starts at the next count field met (excluding RO) and continues until the last record on the track has been read. If a Read Multiple CKD command is issued after the count field of the last record on the track has been passed, channel end and device end status is presented and no data is transferred. Because the actual number of bytes to be read is probably not known, the byte count should be greater than the track capacity of the device. The channel status word (CSW) residual count, with the CCW count, can be used to determine how many bytes were really read. The Read Multiple CKD command does not have to start at the beginning of the track. For example, if a track has 50 records and the key field of record 26 cannot be read, the following chain will read the first 25 records and detect the error in the key area of record 26:

Read Home Address
Read RO
Read Multiple CKD

Analysis of the sense information, CSW residual count, CCW count, and the records already transferred to main storage, allows construction of the following chain:

Search ID (record 26)
TIC *-8
Read Data
Read Multiple CKD

This command chain would recover the data of record 26 and all following records on the track. The only unrecovered data would be the key area of record 26. CHANNEL END and DEVICE END are presented to the channel at the completion of the operation. Because command retry works only on single records, certain errors cannot be retried in the multiple-record mode after the first record has been processed. Use of this command should be limited to those applications where its convenience outweighs the exposure to reduced error recovery capability. In record access mode, this command is rejected with unit check, channel end, and device end in the status.

The Read Record Zero (RO) command transfers the count, key, nd data bytes of record O from the device to the channel. In direct mode, command chaining requirements exist. In record access mode, this command must be executed in buffer submode of record access mode and chained from a Locate Record command. If it is not, it is rejected with unit check in the ending status. In the direct mode, record O, the track descriptor record, has the normal count, key, and data format and may be used as a normal data record. However, it is usually reserved by the operating system for nonuser functions. During the execution of this command, the storage director searches for index, clocks through gap G1, home address, and gap G2, and transfers the count, key, and data areas of RO to the channel. A Read RO command chained from a Read Home Address or Search Home Address command is executed immediately and does not cause a search for index. The validity of each of the count, key, and data areas is verified by the correction code bytes that follow each of the areas. If a data overrun or data check is detected during the execution of this command, the storage director attempts recovery with command retry. If command retry is unsuccessful, CHANNEL END, DEVICE END, and unit check are presented to the channel. In the record access mode, the Record Zero record must consist of an eight byte count area followed by an eight byte data area. The Record Zero record is transferred from the buffer allocated by the preceding Locate Record command to the channel. On completion of data transfer, channel end and device end are presented to the channel. If the Read Record Zero command does not consist of an 8-byte count plus an 8-byte data area, this command is rejected with unit check in the ending status.

Write commands transfer data from main storage to disk storage. Data is fetched from host processor 12 main storage in an ascending order of addresses, starting with the address specified in the data address field of the channel command word. In direct mode, all standard Count, Key, and Data architecture write commands are accepted and perform their normal function. No attempt is made to determine if a record is in the cache. In direct mode, records will never be stored in the cache 100. Direct mode operations transfer data directly from the channel 14 to a device 26, et al.

In record access mode, only the Write Record Zero, Write Count, Key, and Data, Write Update Data, and Write Update Key and Data commands are accepted. Non-formatting write commands change the content of existing key and data areas but cannot change the number or length of existing records. Formatting write commands change the format of the track by adding, deleting, or changing the lengths of records. These commands require specific file mask settings.

The Write Count, Key, and Data (CKD) command causes a complete record to be transferred from host processor 12 main storage and written on the addressed DASD. In direct mode, this command must be chained from a successful Search ID Equal or Search Key Equal command that compared equal on all bytes, or from a Write Record Zero, or Write Count, Key, and Data command. If it is not, it is rejected with unit check in the status. A Read Data, Read Key and Data, Write Data, or Write Key and Data may be inserted between the Search ID Equal and Write CKD commands. A Read Data or Write Data command may be inserted between a Search Key Equal and the Write CKD command. In record access mode, the command may or may not cause disconnection from the channel. This command must be chained from a Locate Record command that specified a format write subcommand and a search modifier of 0 or from another Write Count, Key, and Data command and must be received within the domain of the Locate Record command. If these conditions are not met, the command is terminated and unit check is presented in ending status In the direct mode, the count, key, and data areas of a record are transferred from host processor 12 internal main storage and written on the addressed device 26, et al. The first eight bytes of data transferred are the count area: cylinder number (two bytes), head number (two bytes), record number (one byte), key length (one byte), and data length (two bytes). The remaining data sent from main storage is written in the key and data areas as specified by the values set in the key length (KL) and data length (DL) bytes. The count field of the CCW specifies the total number of bytes to be transferred (8+KL+DL). If the count is less than specified zeros, are written in the remainder of the record. Correction code bytes are written at the end of the count area, end of the key area, and end of the data area. If the Write CKD command is the last format write command in a chain, the remaining portion of the track is erased. If a command other than another format write is chained from Write CKD, it is executed after the track is erased. Channel end and device end are presented after the data transfer is complete.

In record access mode, this command must be executed in the buffer submode of record access mode. The count, key, and data access areas of the record to be updated are transferred from the channel to the buffer allocated by the preceding Locate Record command. The sum of the values in the key length and data length portions of the count field are compared to the blocksize value from the preceding Define Extent command. The data length field is also checked for a non-zero value. If the sum of eight, the key length and the data length is not equal to the blocksize or if the data length is equal to zero, the channel program is terminated with unit check in the ending status. If this command is not the last Write Count, Key, and Data command in the domain of the Locate Record command, channel end and device end are presented following completion of data transfer to the buffer. If this command is the last Write Count, Key, and Data command in the domain of the Locate Record command, channel end is presented following completion of data transfer to the buffer. All records in the buffer are then transferred to the DASD. The key and data areas of the record searched for are skipped over before writing begins. DEVICE END is then presented to the channel All cache entries for the track operated on by the Write Count, key, and Data commands are invalidated. Modified records for the track being operated on by the Write Count, Key, and Data command were destaged during the preceding Locate Record command processing.

The Write Record Zero (RO) command causes the count, key, and data areas of record 0 to be transferred from main storage and written on the device. The Write RO command must be preceded by a Set File Mask or Define Extent command that allows writing record 0. In direct mode, this command must be chained from a successful Search Home Address Equal command that compared equal on all its four bytes or from a Write Home Address command. In record access mode, this command must be chained from a Locate Record command that specified the Format Write subcommand and the Home Address search operation.

In the direct mode, record O, the track descriptor record, is always the first record on the track following the home address area. Although RO may be used as a normal data record, it is usually reserved by the operating system to store pertinent track information. The first eight bytes of data transferred are the count area: cylinder number (two bytes), head number (two bytes), record number (one byte), key length (one byte), and data length (two bytes). The remaining data sent from main storage is written in the key and data areas as specified by the values set in the key length (KL) and data length (DL) bytes. The count field of the CCW specifies the total number of bytes to be transferred (8+KL+DL). If the count is less than (8+KL+DL), zeros are written in the remainder of the record. Correction code bytes are written at the end of the count area, end of the key area, and end of the data area. If the Write RO command is the last format write command in a chain, the remaining portion of the track is erased. If a command other than another format write is chained from Write RO, it is executed after the track is erased. Because reconnection may not occur until some time after index is passed, the next command may not be oriented. Record O is normally written on the tracks by the disk manufacturer. The use of this command should be limited to identifying defective tracks and assigning alternate tracks. Utility programs are available to perform these functions. Proper operation with IBM operating systems require a key length of 0 and an eight-byte data field.

In record access mode, the Write Record Zero command must be executed in the buffer submode of record access mode. The count and data areas of the record zero record to be updated are transferred from the channel to the buffer allocated by the preceding Locate Record command. The record zero count must consist of an eight byte count area and an eight byte data area. The count field must specify a zero length key area and an eight byte data area. If these conditions are not met, the command is rejected with unit check in the ending status. Channel end is presented following the completion of data transfer to the buffer 112. The record zero record stored in the buffer 112 is then transferred to the addressed DASD. The remainder of the track is erased. All cache entries for the track operated on by the Write Record Zero command are invalidated and device end is presented to the channel.

The Write Update Data command causes the specified data stored in host processor 12 internal main storage to be transferred from the channel 14 to the data area of a record. A Write Update Data command must be chained from and be within the domain of a Locate Record command that specified a Write Data subcommand or from another Write Update Data command. If the command chain is operating in record cache submode, and both nonretentive access is in effect for the command chain and nonretentive data is enabled for the addressed device, CHANNEL END and DEVICE END are presented following the completion of data transfer to the cache. If the command chain is operating in record cache submode, and either nonretentive access is not in effect for the command chain or nonretentive data is disable for the addressed device, CHANNEL END is presented following the completion of data transfer to the cache. DEVICE END is presented following the completion of the data transfer to the DASD. If the command chain is operating in buffer submode, and the Write Update Data command is not the last command in the domain of the Locate Record command, CHANNEL END and DEVICE END are presented following the completion of data transfer to the cache. If the command chain is operating in buffer submode, and the Write Update Data command is the last command in the domain of the Locate Record command, CHANNEL END is presented after data transfer is complete to the cache. DEVICE END is presented after all records in the domain have been transferred to the DASD.

In the direct mode, this command is rejected with unit check, CHANNEL END, and DEVICE END in the status. In record access mode, the Write Update Data command is executed in either record cache submode or buffer submode as determined by the preceding Define Extent command. In record cache submode, the blocksize value from the preceding Define Extent command must be equal to the data length of the record to be updated. If the record exists in the cache, the blocksize value must equal the data length of that record, otherwise the blocksize must equal the data length of the record on the DASD. If the blocksize is not equal to the data length of the record to be updated, the channel program will be terminated with unit check in the ending status. The data is transferred from the channel 14 to the cache entry. If the preceding Define Extent command specified the inhibit cache loading attribute and a new record slot was allocated for this access, the record slot is deallocated. If the preceding Define Extent command specified the inhibit cache loading attribute and a new record slot was not allocated for this access, the record slot position on the LRU list remains unchanged. In buffer submode, the data is transferred from the channel 14 to the buffer 112 allocated by the preceding Locate Record command. The blocksize value from the preceding Define Extent command must be equal to the data length of each record to be updated. If it is not, the channel program is terminated with unit check and DEVICE END is presented to the channel. All cache entries for which data was transferred by the Write Update Data commands in the domain of the Locate Record command are invalidated.

The Write Update Key and Data command causes the specified data stored in host processor 12 to be transferred through the channel 14 to the key and data areas of a record on the addressed device. A Write Update Key and Data command must be chained from and be within the domain of a Locate Record command that specified a Write Data subcommand or from another Write Update Key and Data command.

In record access mode, this command must be executed in buffer submode of record access mode. If it is not, it is rejected with unit check in the ending status. Data chaining should not be used between the key and data fields for the Write Update Key and Data command, when this command appears within the domain of a Locate Record command. When data is written to the buffer area, the boundary between the key and data fields is not known. Therefore, the subsystem 10 is not able to pause between the key and data fields to allow the channel hardware the time to perform the data chaining operations. Data overruns will result if data chaining is used under these conditions. When operating in record access mode, data chaining should also not be used for parameters of control commands. Data streaming will be used as a transfer mechanism for some control commands and use of this mechanism prohibits data chaining.

In direct mode, this command is rejected with unit check, channel end, and device end in the status. In record access mode, if the Write Update Key and Data command is received in a command chain that is not operating in buffer submode, the command is rejected with unit check in the ending status. The key and data areas of the record to be updated are transferred from the channel to the buffer area allocated by the preceding Locate Record command. If this command is not the last Write Update Key and Data command in the domain of the Locate Record command, channel end and device end are presented following the completion of data transfer to the buffer. If this command is the last Write Update Key and Data command in the domain of the Locate Record command, channel end is presented following the completion of data transfer to the buffer. All records in the buffer are then transferred to the DASD. The blocksize value from the preceding Define Extent command must be equal to the sum of the key length and data length of each record to be updated. If it is not, the channel program is terminated with unit check. All cache entries for which data was transferred by the Write Update Key and Data commands in the domain of the Locate Record command are invalidated and device end is presented to the channel.

Thus, while the invention has been described with reference to preferred embodiments thereof, it will be understood by those skilled in the art that various changes in form and details may be made without departing from the scope of the invention.

What is claimed is:

1. In a data storage hierarchy having a front store and a back store each of which have a multiplicity of addressable data storage locations with diverse ones of the addressable data storage locations being further divided into addressable record locations of diverse sizes; programmable processor means connected to said front and back stores and data transfer means connected to said programmable processor means and to said front and back stores for effecting data transfers between the stores in response to commands received from the programmable processor means; attachments means connected to said programmable processor means and to said data transfer means for effecting data transfers between the attachment means and said data transfer means in response to commands received from the programmable processor means; control storage means operatively connected to the programmable processor means for supplying programming indicia signals to the programmable processor means and for storing control signals supplied by the programmable processor means and for supplying such stored processor control signals to said programmable processor means;

the improvement, including the combination of:

means for indicating for each record of each track of each device in said back store;

means responsive to said indicating means for transferring said first or said second version of said record in accordance with predetermined criteria;

indicating further comprising: a first table having at least one bit for each device in said back store; a second table having at least one bit for each track of each said device; and a third table having a plurality of entries, each entry having indicia of location of a record in said cache;

means for controlling asynchronous destaging of records, in response to information stored in said first and second tables; and said asynchronous control means comprising a fourth table for storing information for each record to be asynchronously destaged to the back store whether a first version of record data stored in said front store is modified with respect to a second version of said record stored in back store.

2. A method for improving data transfer between host and a peripheral subsystem including a relatively fast access cache and a relatively slow access backing store having a plurality of addressable data storage devices, each of the devices having a plurality of addressable data storage tracks, comprising the steps of: defining a first table having at least one bit for each device in said back store; defining a second table having at least one bit for each track of each said device; defining a third table having a plurality of entries, each entry having indicia of location of a record in said cache; defining a fourth table having a first and second partitions, said first partition being an array having N bytes, N being equal to a total of record numbers storable in the backing store, and said second partition comprising a plurality of entries, each said entry comprising one or more bytes of data containing record identifying indicia, there being at least a number of said entries in said second partition, equal to a maximum number of records to be stored on a track of a device in said back store; defining an area of said cache as a track buffer, said buffer having sufficient storage capacity to store all records from one track of a device in the back store; determining for each record transfer between said host and said subsystem by reference to said first, second and fourth tables whether there is a version of said record in cache including scanning said last-mentioned tables; and checking said third table for ascertaining whether or not said record in said back store for determining if such version does or does not exist in the cache.

3. A method according to claim 2 further comprising the step of: transferring said version of said record if such version exists in cache.

4. A method according to claim 2 further comprising the step of: transferring said record from back store if such version does not exist in cache.

5. A method according to claim 2 further comprising the step of: determining by reference to said defined tables whether a first version of a record in cache is modified with respect to a second version of said record in back store.

6. A method according to claim 5 further comprising the step of: transferring said first version of said record if such first version is modified with respect to said second version.

7. A method for locating an updated version of a record in a peripheral subsystem having a relatively fast front store and a relatively slow back store, said back store having a plurality of physical addresses, each such physical address having at least first and second segments, each first segment including a plurality of said second segments, each said second segment storing one or more records, comprising the steps of:

first determining, for a first segment of a physical address, whether any associated records have been updated;

second determining, for a second segment associated with said first segment, whether any associated records have been updated;

third determining, for an index table word associated with said second segment, whether any directory entry identifiers are present;

fourth determining if a directory entry in said front store is associated with said index table word;

fifth determining whether all directory entries associated with said index table word have been read, if said directory entry is not associated with said physical address;

reading a next directory entry associated with said index table word if all such associated directory entries have not been read;

first repeating said fourth determining step until a directory entry associated with said physical address or all directory entries have been read;

sixth determining whether a record identified by said directory entry is an updated record, if said directory entry is associated with said physical address;

second repeating said fifth determining, first repeating and sixth determining steps until all directory entries have been read;

first storing updated record information in a first partition of said partitioned table;

second storing a record identifier associated with said updated record in a second partition of said partitioned table;

third repeating said third determining step for a next directory entry identifier in said index table; and repeating said above sequence until all updated records at all physical addresses in said subsystem have been located.

8. Apparatus for locating an updated version of a record in a peripheral subsystem having a relatively fast front store and a relatively slow back store, said back store having a plurality of physical addresses, each such physical address having at least first and second segments, each first segment including a plurality of said second segments, each said second segment storing one or more records, comprising:

first means for determining, for a first segment of a physical address, whether any associated records have been updated;

second means for determining, for a second segment associated with said first segment, whether any associated records have been updated;

third means for determining, for an index table word associated with said second segment, whether any directory entry identifiers are present;

fourth means for determining if a directory entry in said front store is associated with said index table word;

fifth means for determining whether all directory entries associated with said index table word have been read, if said directory entry is not associated with said physical address;

means for reading a next directory entry associated with said index table word if all such associated directory entries have not been read;

sixth means for determining whether a record identified by said directory entry is an updated record, if said directory entry is associated with said physical address;

second means for repeating said fifth determining, first repeating and sixth determining steps until all directory entries have been read;

first means for storing updated record information in a first partition of said partitioned table; and second means for storing a record identifier associated with said updated record in a second partition of said partitioned table.

9. Apparatus according to claim 8, wherein said first means for determining further comprises: a first table having at least one bit for each first segment in said back store.

10. Apparatus according to claim 8, wherein said second means for determining further comprises: a second table having at least one bit for each second segment associated with each physical address.

11. Apparatus according to claim 8, wherein said third means for determining further comprises: a third table having a plurality of entries, each entry having indicia of location of a record in said front store.

12. Apparatus according to claim 8, wherein said first means for storing further comprises: a first partition of a partitioned table having a plurality of entry locations therein, each such entry location comprising one or more bytes of information associated with an updated record stored in said front store.

13. Apparatus according to claim 8, wherein said second means for storing further comprises: a second partition of a partitioned table having a plurality of entry locations therein, each such entry location comprising one or more bytes of information associated with a record number of an updated record stored in said front store.

14. In a data storage hierarchy having a data-storing cache and a data-storing backing store, attachment means, data transfer means connected to said cache, to said backing store and to said attachment means for transferring data therebetween, a control processor connected to said cache, to said store and to said data transfer means for controlling same and to said attachment means for receiving requests for data stored in the backing store and for storing data in said cache and backing store, said backing store having data storage locations grouped into addressable tracks, said cache having data storage locations allocatable into diverse-sized groups;

the improvement including, in combination:

allocation indication means connected to said cache and to said processor for indicating the groups of data locations in the cache as being a first number of track sized groups, a second number of said first-sized records each having a data-storage capacity less than said track sized group and a third number of said second-sized records each having a data-storage capacity less than each of said first-sized records;

data-transfer programming indicia means in said control processor for enabling the control processor to control said data transfer means to selectively effect data transfers between the backing store and said attachment means and copy the transferred data to said cache in either said first-sized or second-sized record groups, to transfer data between said backing store and said attachment means via a one of said track-sized groups in said cache and erasing such data from said one track-sized group upon completion of such data transfer; and update programming indicia means in said control processor for enabling the control processor in conjunction with said data-transfer programming indicia means to access either said first-sized or second-sized groups while simultaneously transferring a copy of data through said one track-sized group and whenever the data stored in any of said first-sized or second-sized groups is a copy of data currently being transferred through said one track-sized group for making the copy of data stored in said first or second sized groups congruent to the data being transferred.

15. In the data-storage hierarchy set forth in claim 14, further including, in combination:

directory means indicia stored in said cache having an entry for each said first-sized and second-sized group in the cache, each said entry including most recently used (MRU) control indicia, group size indicating indicia, back store address indicia, and record group address in cache, and said control processor accessing said directory means indicia when executing said data-transfer programming indicia means and said update programming indicia means for accessing said groups to effect data transfers into and out of the cache.

* * * * *